United States Patent
Akula

(10) Patent No.: US 11,703,851 B2
(45) Date of Patent: *Jul. 18, 2023

(54) PLANNED MAINTENANCE BASED ON SENSED LIKELIHOOD OF FAILURE

(71) Applicant: ORACLE INTERNATIONAL CORPORATION, Redwood Shores, CA (US)

(72) Inventor: Dheeraj Akula, Vancouver (CA)

(73) Assignee: ORACLE INTERNATIONAL CORPORATION

( * ) Notice: Subject to any disclaimer, the term of this patent is extended or adjusted under 35 U.S.C. 154(b) by 0 days.

This patent is subject to a terminal disclaimer.

(21) Appl. No.: 17/532,554

(22) Filed: Nov. 22, 2021

(65) Prior Publication Data

US 2022/0083044 A1    Mar. 17, 2022

Related U.S. Application Data

(63) Continuation of application No. 16/727,028, filed on Dec. 26, 2019, now Pat. No. 11,194,321.

(51) Int. Cl.
    *G05B 23/02*    (2006.01)
(52) U.S. Cl.
    CPC ..... *G05B 23/0283* (2013.01); *G05B 23/0232* (2013.01); *G05B 23/0281* (2013.01)
(58) Field of Classification Search
    CPC .............. G05B 23/0232; G05B 23/024; G05B 23/0281; G05B 23/0283
    USPC ...................................................... 702/184
    See application file for complete search history.

(56) References Cited

U.S. PATENT DOCUMENTS

| 7,683,787 | B2 | 3/2010 | Czyszczewski et al. |
| 8,290,746 | B2 | 10/2012 | Urmanov et al. |
| 8,566,182 | B2 | 10/2013 | Brower et al. |
| 9,524,309 | B2 | 12/2016 | Ewer |
| 9,569,445 | B2 | 2/2017 | Flores et al. |
| 9,665,433 | B2 | 5/2017 | Grewal |
| 11,194,321 | B2 * | 12/2021 | Akula ................ G05B 23/024 |
| 2005/0131729 | A1 | 6/2005 | Melby et al. |

(Continued)

OTHER PUBLICATIONS

U.S. Patent and Trademark Office, Final Office Action issued in U.S. Appl. No. 15/181,564, filed Jun. 14, 2016, having a dated May 23, 2022 (35 pgs).

(Continued)

*Primary Examiner* — John H Le
(74) *Attorney, Agent, or Firm* — Kraguljac Law Group, LLC

(57) ABSTRACT

Systems, methods, and other embodiments associated with long-term predictions for specific maintenance within a planned maintenance schedule. In one embodiment, a method includes updating a failure probability curve for a component part of a device based at least in part on data obtained from a sensor associated with the component part; determining based at least in part on the updated failure probability curve that a likelihood of failure for the component part following a first upcoming planned maintenance and before a second upcoming planned maintenance exceeds a threshold; and transmitting a work order for specific maintenance to reduce the likelihood of failure of the component part to be performed during the first upcoming planned maintenance.

20 Claims, 11 Drawing Sheets

(56) References Cited

U.S. PATENT DOCUMENTS

| | | |
|---|---|---|
| 2005/0253704 A1 | 11/2005 | Neuwirth |
| 2006/0053075 A1 | 3/2006 | Roth et al. |
| 2011/0054806 A1 | 3/2011 | Goldfine et al. |
| 2012/0123951 A1 | 5/2012 | Hyatt et al. |
| 2015/0100571 A1 | 4/2015 | Floyd et al. |
| 2015/0364017 A1 | 12/2015 | Hall et al. |
| 2016/0071004 A1 | 3/2016 | Salahshoor et al. |
| 2017/0248965 A1 | 8/2017 | Wellman et al. |
| 2017/0357952 A1 | 12/2017 | Scott et al. |
| 2019/0156443 A1 | 5/2019 | Hall |

OTHER PUBLICATIONS

Oracle Corporation; Oracle Cloud: Developing Applications with Oracle Internet of Things Cloud Service, 19.1.5; pp. 1-201, Copyright 2015, 2019, Redwood Shores, CA.

James Kovacevic; High Performance Reliability; How Equipment Fails, Understanding the 6 Failure Patterns; pp. 1-4, Sep. 21, 2015; downloaded from: https://hpreliability.com/how-equipment-fails-understanding-the-6-failure-patterns/.

Oracle Corporation; Oracle Internet of Things Cloud Service; pp. 1-6, Copyright 2016, Redwood Shores, CA.

Oracle Corporation; Data Sheet / Oracle Maintenance Cloud, pp. 1-6, Copyright 2018, Redwood Shores, CA.

Safa Ayaz; Oracle Corporation; Oracle SCM Cloud Using Maintenance; pp. 1-102, copyright 2011, 2019, Redwood Shores, CA.

U.S. Patent and Trademark Office, Notice of Allowance issued in U.S. Appl. No. 15/181,564, filed Jun. 14, 2016, having a dated Dec. 14, 2022 (19 pgs).

Velmurugan, RS and Dhingra, Tarun, Maintenance strategy selection and its impact in maintenance function. International Journal of Operations & Production Management, 35.12: 1622-1661. Bradford: Emerald Group Publishing Limited. (2015).

\* cited by examiner

PLANNED MAINTENANCE BASED ON SENSED LIKELIHOOD OF FAILURE

CROSS-REFERENCE

This disclosure is a continuation of and claims the benefit of priority to U.S. patent application Ser. No. 16/727,028, entitled "Long-Term Predictions for Maintenance," inventor Dheeraj AKULA, filed Dec. 26, 2019, which is incorporated herein by reference in its entirety for all purposes.

BACKGROUND

Maintenance to prevent failure of physical devices is commonly performed according to fixed (and often very conservative) schedules. Further, maintenance of individual components of the device may be based on human inspection and judgment regarding the state of the component. Through manual supervision, the human inspector understands use factors that affect the wear on the component, but the inspector's judgment regarding maintenance is subjective, and risks both (i) excessive, inconclusive maintenance ('waste' according to the Total Quality Management (TQM)/ Just-In-Time (JIT) paradigm); and (ii) component or device failure due to insufficient maintenance.

Internet of things (IOT) sensors may be added to physical devices to monitor the operation of those devices, thereby creating an IOT-connected device. A computing system configured to evaluate the output of the IOT sensors detect that operating conditions of the device are abnormal. The abnormal operating condition may indicate imminent failure of one or more component parts of the device. Thus, in response to detecting the abnormal operating condition of the device, the computing system can generate an output indicating that the device should be serviced, for example by replacing the failing component, or taking other steps that will prevent the failure of the component.

But, even if the computing system can predict an equipment failure of the device based on the output of the IOT sensors, service to prevent the failure may be undesirable or impossible before the predicted failure occurs. Commonly, devices should be taken out of service only on a planned schedule compatible with the operations of the business entity using the device. Detection of a deviation from normal operating conditions by the IOT sensors often does not provide sufficient lead time to allow corrective maintenance during the next scheduled maintenance shutdown. Often, by the time abnormal operating conditions are detected with IOT sensors, it is too late to include the maintenance in a normally scheduled maintenance shutdown.

In short, today's predictive maintenance solutions are based on IOT sensor feeds that don't indicate that machine or component part will fail until after an abnormal vibration or noise, abnormal temperature reading, or other abnormal condition is detected. Thus, IOT-sensor-based failure predictions are only as good as the first detected abnormal condition. But, by the time these abnormal conditions start appearing, the equipment is likely only days away from failure. For example, where a device is shut down for maintenance on a monthly schedule, IOT sensors may, in the first week following a maintenance shutdown, detect abnormal operating condition that indicates failure of a component part within a few days. Thus, the component part must either be allowed to fail, followed by an unscheduled shutdown of the device for repair, or an unscheduled shutdown for maintenance must occur, and maintenance to prevent the failure performed. Thus, IOT sensing alone is allows only short-term maintenance prediction that is inadequate to allow for appropriate or convenient maintenance scheduling.

Instead, predicted need for maintenance must be sufficiently in advance of a potential component failure to allow maintenance to prevent the failure to be performed during a scheduled maintenance shutdown. This can require prediction of failure well before IOT sensors detect abnormal operation.

Standard history-based predictions, such as those based on linear extrapolations of historical incidence of reactive maintenance instances, are of little help in predicting the maintenance requirements because (i) the failure data is non-continuous, and (ii) the desired prediction is a prediction for maintenance, and not a prediction of a failure.

Also, maintenance schedules may be dictated by the low availability of skilled labor. Further, the available labor may be trained in a specific skill set and assigned only work that can be serviced with those skills. This shortage of labor may grow more extreme as the specialization of the device increases. Maintenance on a very specialized device may, in some cases, be performed by one of only a handful of people trained to service that particular device.

In some instances, the lack of skilled labor can be mitigated by modular design of the device. In this case, the modular design allows component modules of the device (or even the device itself) to be replaced with low skill labor. For systems with such modular design substituted in the place of maintenance, even a robot can conduct the replacement of the module. But, regardless of whether the module replacement is replaced by a human or by a robot, the human or robot needs to know what component module to replace.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
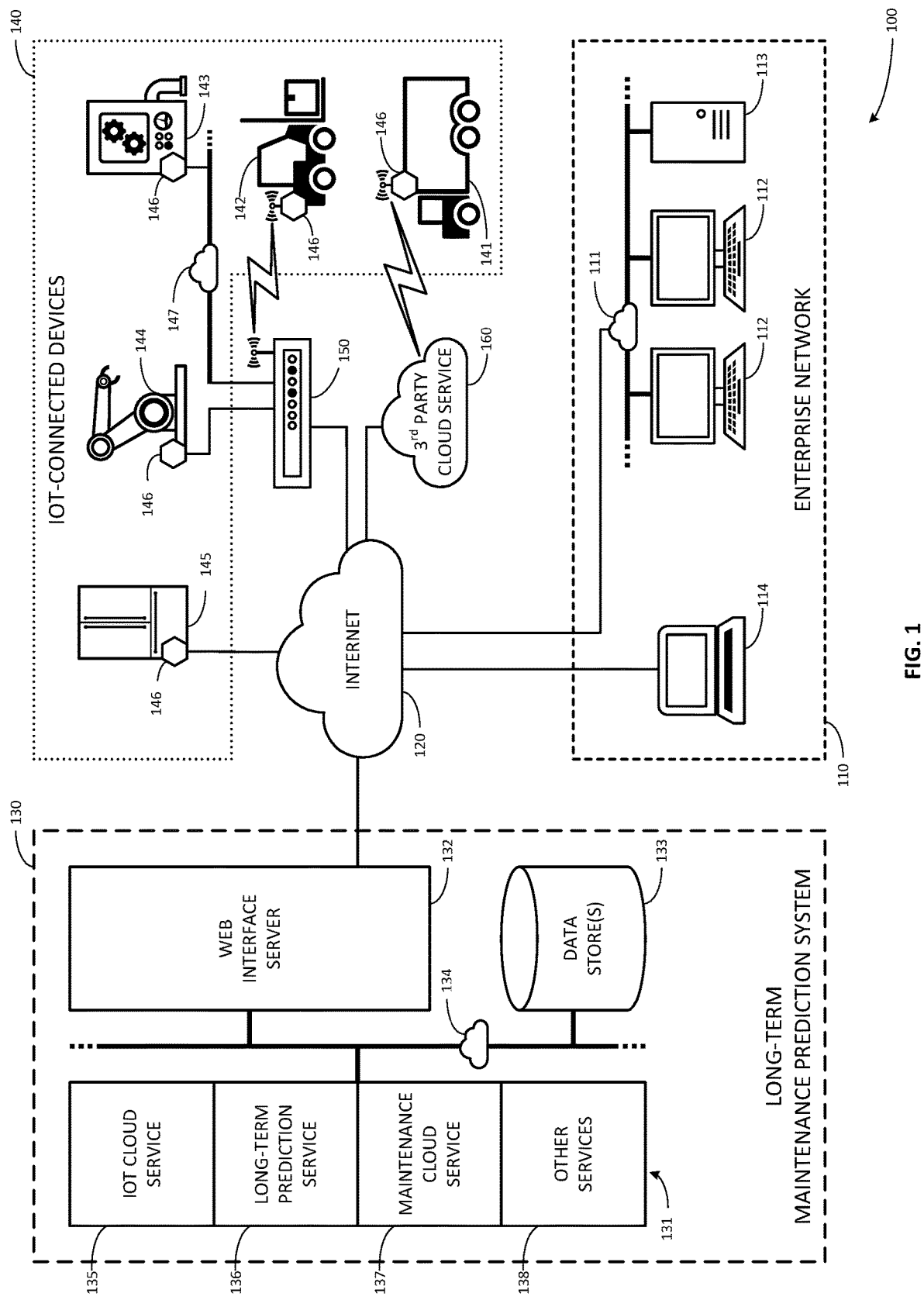
FIG. 1 illustrates one embodiment of a multi-tenant system 100 including long-term specific maintenance prediction.

Systems, methods, and other embodiments are described herein that provide long-term predictions for specific maintenance (rather than general maintenance) using feedback loops. In one embodiment, systems, methods, and other embodiments are described herein that provide probability-based long term predictions for specific maintenance within a planned (that is, an already existing) maintenance schedule. In one embodiment, the failure probability of a machine can be modeled over a practically endless amount of use by fitting a failure probability curve to factors that have an impact of the failure of the machine. The probability curve in turn is used to predict likelihood of failure of the machine after any amount of use. Further, feedback loops based on observed conditions of the machine may be used to tune the accuracy of the failure probability curve.

Where short-term predictive maintenance based solely on IOT feeds that do not indicate that a device or component will fail until after IOT sensors start showing abnormal heating, noise, or other indications of impending failure, the systems and methods disclosed herein enable long-term predictions for specific maintenance well in advance of the sensor indications. This extends the advance warning for preventative maintenance from a few hours or days into an advance notice of weeks or months, or even years.

As discussed above, even if a device failure is predicted based on IOT sensor detection of abnormal operation, the device may be taken out of service only according to a planned schedule that satisfies the organization that owns or uses the device. In many cases, compliance with such a schedule requires a failure prediction much further in advance of the time IOT sensors detect abnormal operation of the device. For example, the device may be part of a continuous process manufacturing facility, such as a steel mill or refinery, which only shut down for maintenance activity at scheduled intervals. Where the IOT sensors do not detect the abnormal condition until after production has begun, and the abnormal condition indicates a failure before the next shutdown, the prediction is too late to be useful. It may be impossible to stop production to make the required repair without (i) causing greater damage to components of the manufacturing facility, and/or (ii) incurring unreasonable expense due to the unscheduled shutdown.

Performing general preventive maintenance according to a schedule without examining the particular status of the device (i) can be wasteful, consuming parts and labor that may not yet be needed to ensure continued operation of the device and/or the device's component parts, and (ii) can also be inadequate, undertaking an unacceptably high risk of device or component part failure. Accordingly, it is most useful to identify specific maintenance with sufficient lead time to allow the specific maintenance to be performed during scheduled maintenance, but without performing excessive maintenance. To that end, feedback loops may be used to tune the maintenance of the device.

In some situations, a device is made up of one or more component parts. Each component part is associated with a probability curve that associates probability of the part failing against some metric of usage of the part. For example, the component part's probability of failure may be plotted against time, uses, heat, or other metrics. This failure probability curve may differ for each part. Further, as each component part is part of the device, the failure of one component part may enhance or otherwise affect the chances of the failure of another component part.

—Long-Term Prediction of Specific Maintenance Needs—

One example of a process for timely predicting specific maintenance needs follows. This is a non-limiting example embodiment.

Initially, a basis for a failure probability curve associated with each component part is identified. For example, the failure probability curve may be based on time or usage (or other metric) since (i) last replacement or initial purchase of the part, or (ii) last servicing of the part.

For each component part, the part failure probability is then updated based on IOT sensor trend information since the basis (last replacement/initial purchase or last servicing), if any such information is available. The IOT sensor(s) that provide the trend information may be directly associated with the part, or associated more generally with the device.

For each component part, the part failure probability is then updated based on causal factors that affect the probability of failure. In one embodiment, casual factors are those qualitative and quantitative factors that have an impact on the failure of a machine. In general, the causal factors are the parameters of the environment in which the machine operates. For example, causal factors may include human operator of the device, dependent part, usage or non-usage of the device, nature of jobs performed by the device, age of the device, operating environment (weather, temperature, humidity, dust, etc.) and other factors. Note that the causal factors may vary based on the physical characteristics of the component part—mechanical parts may have different causal factors from electrical (or other non-mechanical) parts. In one embodiment, the probability of failure of another component part in a machine, device, or system, may also be a causal factor, because the failure of one part may influence the failure of another. For example, the failure of a lubricant pump can have a direct effect on the failure of a gear or bearing.

For each component part, the probability of failure occurring following a planned maintenance and before the subsequent planned maintenance following the planned maintenance (in the next maintenance cycle) is determined.

For each component part, it is determined whether the probability of failure occurring in the next maintenance cycle is unacceptably high (based, for example, on a threshold set by an administrator of the system).

Note that each planned maintenance for a device may involve work orders for general maintenance on the device (such as, where the device is a vehicle, a scheduled oil change) and for selected health checks on component parts of the device (such as inspecting brake wear every third planned maintenance). Failed health checks involve further work orders to make repairs to correct the condition that caused the failed health check (for example, a work order to replace brake pads and rotors).

For each component part where the probability of failure occurring in the next maintenance cycle is unacceptably high, order a health check and work order to correct the condition to be performed in the planned maintenance. But, in some situations, where the effect of the part failure is not critical, the work order may be deferred until the subsequent planned maintenance, or later, or even after failure. Even pre-shift checklists can be updated with highlights or prioritizations on what is more important for each machine.

For the planned maintenance, align skilled labor and/or perform modular replacements based at least in part on the health checks and work orders predicted (as above) for the planned maintenance.

In some embodiments, numeric weights can be applied to the variables that make up the function describing the failure probability curve for each component part of the device. Following each planned maintenance, the weights can be adjusted to cause the failure probability curve to more accurately describe the observed status of the machine. For example, weights for causal factors or representing data trends can be applied to the failure probability curve.

In some embodiments, the failure probability curve does not have to be a "crisp" or continuous set and could instead be an interval set. Multiple probabilities can be obtained for the part for the same period, and a composite probability based on one or more of the multiple probabilities can be determined. For example, the IOT sensor data associated with a type of part and part failure data for this type of part may be stored in a database, and used to generate one or more composite failure probability curve(s) for the part. The composite failure probability curve may be initially selected to be the failure probability curve of a specific component part of that type, and the curve may be modified by weightings to more closely reflect observed performance for the specific component part.

Example Implementation Environment

An example of one possible use case or implementation environment for an embodiment of the inventive system and methods is that of a multi-tenant system or data processing platform. Such platforms may store and process relatively large amounts of data for operating companies who are tenants of the platform. A multi-tenant architecture provides a means for multiple tenants and users associated with those tenants to store and access their data, and to use software applications that reside on a remote platform. Users (generally either employees or customers of one or more tenants) may access content provided on one or more web pages or web application programming interfaces (APIs) provided by (or for) a tenant operating a website or other form for delivering information to users. In a multi-tenant environment, the content may include a one or more distributed software applications for tenants. These one or more software applications may be used by a tenant customer or tenant employee to (i) control functions of the software applications associated with that tenant, and (ii) access data stored in database(s) associated with that tenant. The applications may be configured to operate with or be implemented as a cloud-based networking system, a software as a service (SaaS) architecture, or other type of networked computing solution. In one embodiment, the applications provide at least some of the functions disclosed herein.

The platform is typically implemented as a set of servers or server groups. The platform may also be administered and operated by a third party that provides use of the platform infrastructure as a service to the tenants and each tenant's users. This service may provide data storage, computational processing power, data analytics, and applications or workflows that may be executed with reference to an account's data (in whole or in part, and account-wide or user-specific). In some cases, such services have been described as Software-as-a-Service (SaaS), cloud-based services, web-services, or remote services.

The software applications that reside on a platform may be used to process certain of a user's data by instantiating an occurrence of the software application within the user's account. These software applications may include ones utilized to operate a business, such as device monitoring, management, and maintenance prediction; facilities management; enterprise resource planning (ERP) and customer relationship management (CRM); eCommerce; and financial applications. Tenant customizations to the operation of the architecture may include custom functionality (such as the capability to perform tenant or user-specific functions, workflows, data processing, or operations) built on top of lower level operating system functions.

Some multi-tenant service platforms may offer the ability to customize functions or operations at several different levels of the service platform, from aesthetic modifications to a graphical user interface to providing integration of components and/or entire applications developed by independent third-party vendors. By permitting use of components and/or applications developed by third party vendors, a multi-tenant service can significantly enhance the functionality available to tenants and increase tenant satisfaction with the platform.

FIG. 1 illustrates one embodiment of a multi-tenant system 100 including long-term specific maintenance prediction. Enterprise network 110 may be associated with a business, such as a manufacturer, passenger or freight carrier, service provider, or other type of business. Alternatively, and in accordance with the advantages of an application service provider (ASP) hosted integrated application system (such as a multi-tenant data processing platform), the business may comprise fewer or no dedicated facilities or business network at all, provided that its end users have access to an internet browser and an internet connection. For simplicity and clarity of explanation, the enterprise network 110 is represented by an on-site local area network 111 to which one or more personal computers 112, or servers 113 are operably connected, along with one or more remote user computers 114 that are connected to the enterprise network 110 through the Internet 120 or other suitable communications network or combination of networks. Each personal computer 112 is generally dedicated to a particular end user, such as an employee, customer, or contractor associated with the business, although such dedication is not required. The remote user computers 114 may similarly be dedicated to a particular end user associated with the business. The personal computers 112 and remote user computers 114 can be, for example, a desktop computer, laptop computer, tablet computer, smartphone, or other device having the ability to connect to local area network 111 or Internet 120 or having other synchronization capabilities. The computers of the enterprise network 110 interface with long-term maintenance prediction system 130 across the Internet 120 or another suitable communications network or combination of networks.

Long-term maintenance prediction system 130 may include an integrated application server 131, a web interface server 132, and data stores 133, each operably connected by a network 134. In some embodiments, any or all of the integrated application server 131, the web interface server 132, and the data stores 133 may be implemented on one or more different hardware systems and components, even though represented as single units in FIG. 1. In some example configurations, data store(s) 133 may be implemented using a network-attached storage (NAS) device or other dedicated server device. In one example configuration, long-term maintenance prediction system 130 is operated by a third party for the benefit of multiple account owners/tenants, each of whom is operating a business, and each of whom has an associated enterprise network 110.

In one example configuration, integrated application server 131 includes various modules, such as an Internet of Things (IOT) cloud service module 135, a long-term prediction service module 136, a maintenance cloud service module 137, and may further include various other modules for other services 138. Further, integrated application server 131 may further include user administration modules for governing the access of tenants and users to the long-term maintenance prediction system 130.

In many cases, it will be desirable for the one of the above modules 135-138 to share methods, libraries, databases, subroutines, variables, etc., with one or more other of the above modules 135-138. For example, long-term prediction service module 136 may access various databases and variables of both IOT cloud service module 135 and maintenance cloud service module 137.

Web interface server 132 is configured and adapted to interface with the integrated application server 131 to provide one or more web-based user interfaces for display to end users of the enterprise network 110. Web interface server 132 is also configured and adapted to interface with various internet of things (IOT) connected devices 140.

An IOT-connected device incorporates embedded electronics that convey information related to the IOT-connected device to or from a network. The embedded electronics can include sensors that detect operational characteristics of the device, or can include automation or control systems that cause the device to perform operations. In one embodiment, long-term specific maintenance prediction system 100 includes a variety of example IOT-connected devices, including truck 141, forklift 142, industrial machine 143, robotic arm 144, and consumer refrigerator 145. Note that these are merely examples of IOT-connected devices, and are not to be construed as limiting. Further, IOT-connected devices 140 may include far more individual IOT-connected devices than the few example IOT connected devices 141-145 shown. At present, practically every type of device may be constructed to include IOT connection components 146. IOT connection components 146 incorporate one or more sensors and/or controllers, and are configured (by hardware, firmware, and/or software) to interface with web interface server 132. IOT connection components 146, depending on configuration, may connect to web interface server 132 (i) directly through the Internet 120, (ii) through a gateway device, such as gateway 150, and/or (iii) through a third-party cloud service 160.

In one embodiment, IOT cloud service 135 is a cloud-based data management system for collecting, analyzing, and integrating the data of IOT-connected devices that are in communication with web interface server 132. In one embodiment, IOT cloud service 135 may include the Oracle® Internet of Things Cloud Service. In one example configuration, the IOT cloud service 135 may offer device virtualization, wherein every IOT-connected device 140 is exposed as a set of resources called a device model. Thus, IOT-connected device connectivity is abstracted through IOT Cloud Service 135, standardizing interactions with the IOT-connected device.

The communication between the IOT cloud service 135 and the IOT-connected devices 140 is, in one example, bidirectional—the IOT cloud service 135 can both receive data from and send commands (or other data) to the devices. The web interface server 132 is configured to interact with IOT cloud service 135 through network 134. The web interface server 132 receives commands and data from and sends commands and data to both the IOT cloud service 135 and the IOT-connected devices 140. These commands and data may include (i) commands and data received from the IOT cloud service 135 and directed to one or more IOT-connected devices 140, and (ii) commands and data received from one or more IOT-connected devices 140 and directed to the IOT cloud service 135, in which cases the web interface server relays those commands and data to their intended destination.

In one embodiment, components of long-term specific maintenance prediction system 100 may intercommunicate using a comprehensive set of REST APIs. The REST APIs provide API-based integration between the HTTP-, HTTPS-, XML-, or JSON-capable components of long-term specific maintenance prediction system 100. The REST APIs provide may further provide for integration with other applications and IOT-connected devices. The APIs may provide authenticated access to all aspects of the service. For example, the communication between the web interface server 132 and each of (i) the IOT connection components 146 of refrigerator 145, (ii) gateway 150, and (iii) third party cloud service 160 may be carried out using the REST APIs. Also, the communication among IOT cloud service 135, long-term prediction service 136, maintenance cloud service 137 may be carried out using the REST APIs. Where a communication among the components of the long-term specific maintenance prediction system 100 is described herein, in one embodiment, that communication may be carried out at least in part by a REST API.

Where the IOT connection components 146 of an IOT-connected device are configured with the proper hardware and APIs to interface with the web interface server 132, the communication between the between the IOT cloud service 135 and that IOT-connected device may be directly over a network between the web interface server 132 and the IOT-connected device. An example of such a configuration is shown by the connection between IOT cloud service 135 and IOT connection components 146 of refrigerator 145. Refrigerator 145 incorporates one or more sensors and/or controllers 145 which are configured (by hardware, firmware, or software) to interface with the web interface server 132.

In some situations, the IOT connection components 146 of an IOT-connected device are not configured to interface with the web interface server 132 and/or the IOT cloud service 135. A gateway device, such as gateway 150, may be provided to allow communication between the IOT-connected device and the web interface server 132 and the IOT cloud service 135. The gateway 150 receives data from IOT-connected devices that are not configured to interface directly with the web interface server 132, and forwards the received data to the web interface server 132 in the proper format for acceptance by the web interface server 132 and use by the IOT cloud service 135. Similarly, the gateway receives commands or other data from the IOT cloud service 135 through the web interface server 132, and forwards those commands and data to the IOT-connected device in the proper format for use by that IOT-connected device.

IOT-connected devices may be not configured to interface with the web interface server 132 and/or the IOT Cloud Service 135 for a variety of reasons. For example, the IOT-connected device may be a legacy device with hardware, firmware, or software configured to connect to an IOT service of another vendor and that cannot be updated to communicate directly through the web interface server 132. In one embodiment, the gateway 150 is designed to operate with the web interface server 132 and can accept and execute software or firmware that enables the gateway 150 to communicate with the legacy IOT-connected devices. In another embodiment, the gateway 150 is designed to operate with the legacy IOT-connected devices, and can accept and execute software or firmware that enables the gateway 150 to communicate with the web interface server 132 and the IOT Cloud Service 135. In one embodiment, the gateway 150 is implemented as a dedicated hardware device that implements functions described for the gateway 150. In another embodiment, the gateway 150 is implemented as a software module associated with the web interface server 132.

Example IOT-connected devices forklift 142, industrial machine 143, and robotic arm 144 are each connected to the web interface server 132 through gateway 150. In a first example connection type, the IOT connection components 146 of robotic arm 144 are directly connected to gateway 150 using a device-specific protocol. In a second example connection type, the IOT connection components 146 of industrial machine 143 are connected through a local network 147 (such as an ethernet network) to gateway 150. In a third example connection type, the IOT connection components 146 of forklift 142 are connected through a wireless network to gateway 150. In this configuration, both the gateway 150 and the IOT connection components 146 of forklift 142 include or are connected to hardware that enables wireless transmission of information.

Further, a preexisting third-party cloud service 160 may be in place to manage IOT-connected devices, such as shown with regard to IOT-connected truck 141. The third-party cloud service 160 may be connected to the web interface server 132 to gather data describing the operation of the truck 141. Here, the third-party cloud service 160 may offer additional functionality that is not included in IOT cloud service 135, and therefore it may not be desirable to eliminate the third-party cloud service 160 in favor of the IOT cloud service 135. For example, third-party cloud service 160 may be a fleet telematics service offering specific services between mobile vehicle systems and central dispatch authority in a commercial vehicle fleet. In this configuration, data describing the operation of truck 141 may be available in the third-party cloud service 160, but entirely incidental to the functions of the third-party cloud service 160. In one embodiment, the data of the IOT connection components 146 of truck 141 can then be sent from third-party cloud service through the web interface server 132 to the IOT cloud service 135. In one embodiment, the web interface server 132 can deliver commands and data for IOT connection components 146 of truck 141 to the third-party cloud service 160 for forwarding to the connection components 146 of truck 141.

In one embodiment, long-term prediction service 136 is a cloud-based analysis system for advanced prediction of component failure. In one embodiment, the long-term prediction service is a platform-as-a-service solution for data science, such as Oracle® Analytics Cloud.

Long-term prediction service 136 maintains, in an associated database, a table of component part types and associated failure curves. The component part types are desirably as specific as possible, for example including manufacturer and manufacturer model number for the part. The failure curve associated with the part is desirably as specific as possible to the part type, and desirably is derived from data for the associate component part only. If such data is not available, a more generic curve may be associated with the component part in the table. Further, a generic curve may be assigned for a generic type of a component-part. The generic curve may be derived, for example, from the aggregated data for manufacturer- and model-specific component part types.

In one embodiment, the formula for a failure probability curve can be expressed with the following generic expression:

$$P(\text{Failure in Period } t \text{ of Part } A) = F_{u_t, v_t, \ldots, w_t}\left(\frac{1}{1 + e^{-(a+bX_t)}}\right) \quad \text{(Eq. 1)}$$

Thus, the probability of failure in period t, for any number of current causal factor readings $u_t, v_t, \ldots w_t, X_t$ is equal to the probability of failure given by historic causal factor context for those current causal factor readings.

Certain types of IOT sensor data may indicate wear, damage, or failure for certain component part types. Long-term prediction service 136 maintains, in an associated database, a list of the types of sensor data that indicate such effects on the component type.

In one embodiment, maintenance cloud service 137 is a cloud-based device management system for planning and implementing maintenance processes for devices such as equipment, vehicles, machines, buildings, and other assets. For example, the maintenance cloud service 137 may include features such as:

- a library of standard maintenance operations;
- services for designing and storing custom maintenance processes;
- calendaring services for scheduling maintenance processes;
- calendar- and meter-based device usage tracking;
- maintenance dispatch services including work order generation, resource procurement, and labor allocation for performing maintenance processes;
- reporting services for accepting information describing the results of planned and reactive maintenance.

In one embodiment, maintenance cloud service 137 may include the Oracle® Fusion Maintenance Cloud. in one embodiment, the features of the maintenance cloud service 137 that capture operational context, asset context and maintenance schedules related to a device can provide supporting data into a failure probability model for the device.

In one embodiment, the maintenance cloud service 137 accepts inputs from a user or a connected system that operate to define a device. For example, inputs into the maintenance cloud 137 (such as keystroke and mouse-click inputs through a GUI or import operations) may describe the device in a hierarchy. In the hierarchy may define the device to be made up of one or more component parts, and the device itself may itself be defined to be a component part of another device.

In one embodiment, the maintenance cloud service 137 records calendar-based usage information for a device in a data store such as data stores 133. For each device monitored by the maintenance cloud service 137, device activity is recorded with a time stamp. For example, "device turn on" events, a "device turn off" events, "initial installation" events, "planned maintenance" events, "reactive maintenance" events, are each recorded with an associated time stamp in a database associated with maintenance cloud service 137.

If the device monitored by the maintenance cloud service 137 is an IOT-connected device in the system 100, the "device turn on" and "device turn off" events may be reported by IOT connection components 146 of the IOT-connected device. These events may be intercepted by the maintenance cloud service, for example, during communication from the IOT-connected device to the IOT cloud service 135. Alternatively, these events may be retrieved from records maintained in a database associated with the IOT cloud service 135. The time difference between these events indicates the time the device, and its component parts, are in use (operating time).

In one example configuration, the "initial installation" events, "planned maintenance" events, and "reactive maintenance" events (and the "device turn on" and "device turn off" events for devices that are not configured to report such events) are entered directly into the database associated with the maintenance cloud service 137 by users of the maintenance cloud service 137, such as service personnel. The timestamped "initial installation" events for a device provide a baseline against which the usage of each component part of the device may be measured. Further, the timestamped "planned maintenance" events and "reactive maintenance" events may further be associated with replacement, repair, or other service information regarding specific component parts of the device. For example, in a timestamped "reactive maintenance" event for a device including 10 bearings, the user may enter information indicating that bearing no. 9 was replaced. The service information for replaced, repair, or service provides additional baselines against which the usage of the particular component may be measured. In one embodiment, the operating time for a device from one or more events is calculated and recorded in the database.

In one embodiment, the maintenance cloud service 137 records meter-based usage information for a device in the database associated with the maintenance cloud service 137. The baseline events against which device usage is recorded remain the same, but the metrics for the meter may differ widely. For example, the usage metric may be energy consumed by the device, heating/cooling cycles of the device, units processed by the device, volume of flow of a fluid through the device, or any other metric that indicates the amount of use of a particular device. At the occurrence of each of the "device turn on" events, a "device turn off" events, "initial installation" events, "planned maintenance" events, "reactive maintenance" events, an associated count (rather than a timestamp) of the metric is recorded in a database associated with maintenance cloud service 137. As above, the usage metric may be reported by IOT connection components 146 of the IOT-connected device, and intercepted during communication to the to the IOT cloud service 135 or retrieved from records maintained in a database associated with the IOT cloud service 135.

In one embodiment, the maintenance cloud service 137 makes device usage data (and other maintenance data) available through REST APIs.

In one embodiment, the maintenance cloud service 137 maintains planned maintenance schedules for one or more devices monitored by the maintenance cloud service 137. The planned maintenance schedules include at least future planned maintenance events for a device defined either by a calendar date, a cumulative operation time, or a metric count. For example, the planned maintenance schedule for each device may be stored in a database associated with the maintenance cloud service 137.

Figure 2:
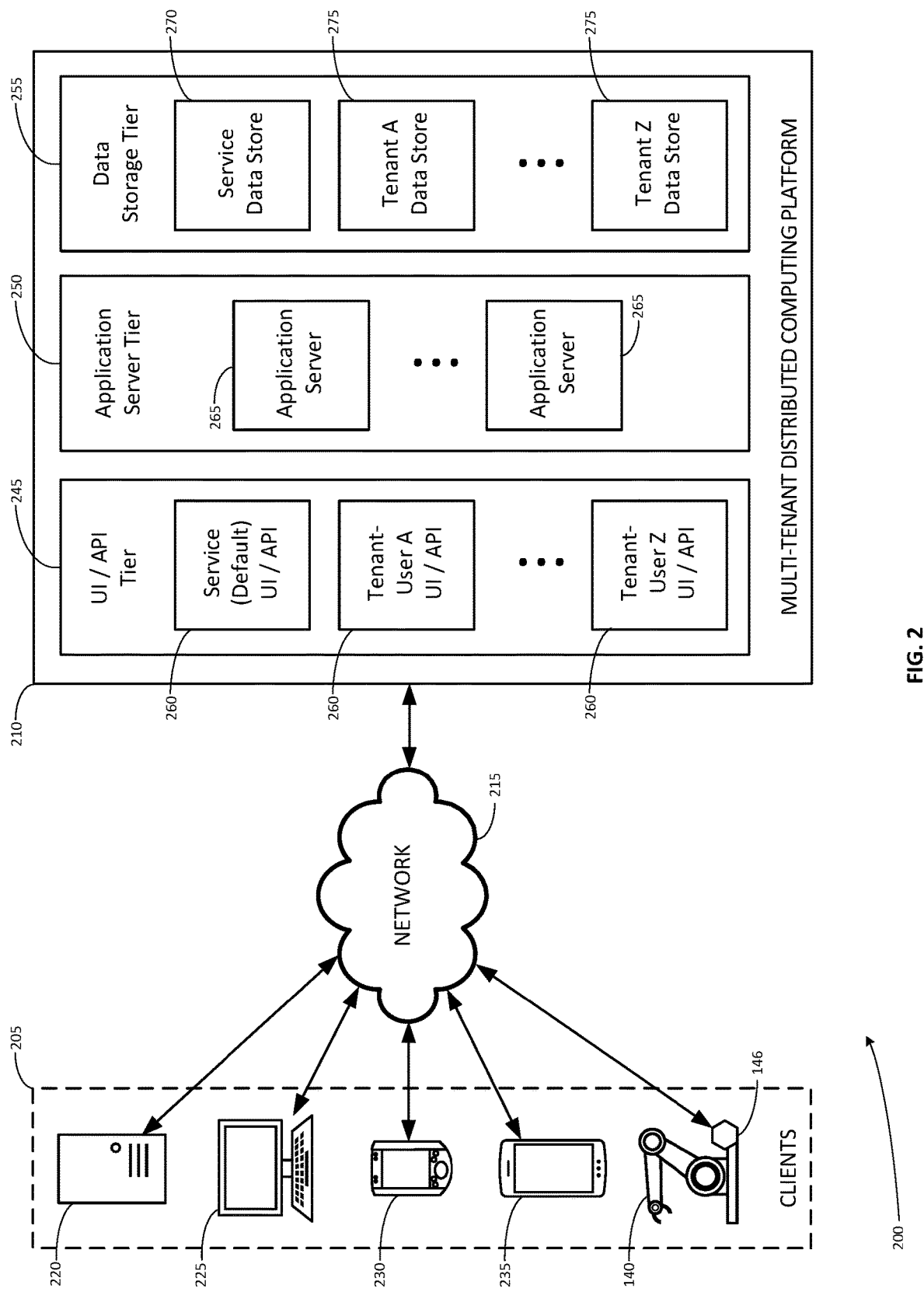
FIG. 2 illustrates elements or components of an example operating environment in which an embodiment of the invention may be implemented.

FIG. 2 is a diagram illustrating elements or components of an example operating environment 200 in which an embodiment of the invention may be implemented. The software architecture depicted in FIG. 2 represents a simplified example of a complex software system to which an embodiment of the invention may be applied.

As shown, a variety of clients 205 incorporating and/or incorporated into a variety of computing devices may communicate with a distributed computing service/platform 210 through one or more networks 215. For example, a client may incorporate and/or be incorporated into a client application implemented by one or more of the computing devices. Examples of suitable clients include web browsers and dedicated client software applications. Examples of suitable computing devices include server computers 220, personal computers such as desktop, laptop or notebook computers 225, tablet computers or personal digital assistants (PDAs) 230, cell phones or smart phones 235, IOT connection components 146 of IOT-connected devices 140, and other electronic devices incorporating one or more computing device components, such as one or more electronic processors, microprocessors, central processing units (CPU), or controllers. Examples of suitable networks 215 include networks utilizing wired and/or wireless communication technologies and networks operating in accordance with any suitable networking and/or communication protocol (e.g., the Internet).

In one embodiment, distributed computing service/platform 210 may be a multi-tenant data processing platform, such as long-term specific maintenance prediction system 100. In this configuration, service platform 210 may be operated by an entity in order to provide multiple tenants with a set of software applications, data storage, and other functionality. These applications, storage, and functionality may include providing web-based user access to information systems, thereby allowing a user with a browser and an Internet or other network 215 connection to view, enter, process, or modify certain types of information. These applications, storage, and functionality may also include providing web-based API access to information systems, thereby allowing an electronic device configured with the correct APIs and an Internet or other network 215 connection to access, enter, process, or modify certain types of information.

The distributed computing service/platform 210 may include multiple processing tiers, including a user interface (UI) and application programming interface (API) tier 245, an application server tier 250, and a data storage tier 255. Each processing tier shown in the figure may be implemented with a set of computers and/or computer components including a processor accessing memory, and may perform various functions, methods, processes, or operations as determined by the execution of a software application or set of instructions.

The interface tier 245 may maintain multiple interfaces 260, including graphical user interfaces and/or web-based interfaces. The interfaces may include a default user interface or API for the service to provide access to applications and data for a user or electronic device associated with a tenant of the service (depicted as "Service (Default) UI/API" in the figure), as well as one or more user interfaces that have been specialized/customized in accordance with user- or device-specific requirements (represented by "Tenant-User A UI/API" . . . "Tenant-User Z UI/API" in the figure). The default user interface may include components enabling a tenant to administer the tenant's participation in the functions and capabilities provided by the service platform, such as accessing data, causing the execution of specific data processing operations, etc., although not all users will necessarily have permission to view these components. In one example, the interface tier 245 is provided by web interface server 132.

The application server tier 250 provides the framework of software to implement the functions or software applications of integrated application server 131 (including the functions of IOT cloud service 135, long-term prediction service 136, and maintenance cloud service 137). Such functions or software applications are typically implemented by one or more modules of software code/instructions that are maintained on and executed by one or more application servers 265 that are part of the platform's application server tier 250.

The data storage tier 255 may include one or more data stores, such as data stores 133, which may include a Service Data store 270 and one or more Tenant Data stores 275 (represented by "Tenant A Datastore" . . . "Tenant Z Datastore" in the figure). Each tenant data store 275 may contain tenant-specific data that is used as part of providing a range of tenant-specific services or functions, including but not limited to the to the functions or software applications of integrated application server 131, such as device monitoring, management, and maintenance prediction; facilities management; ERP, etc. Data stores may be implemented with any suitable data storage technology, including structured query language (SQL) based relational database management systems (RDBMS).

Figure 3C:
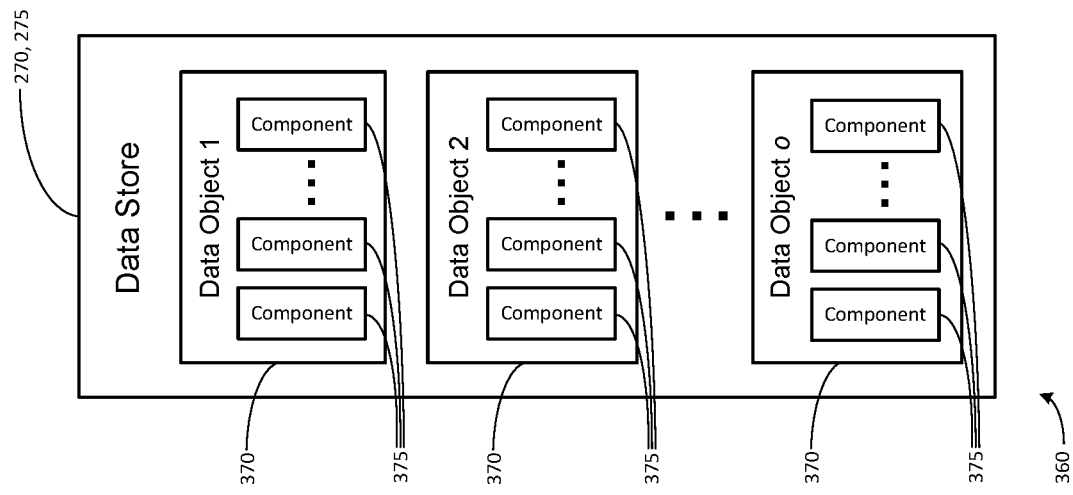
FIG. 3C illustrates additional details of the elements or components of a data store.
Figure 3B:
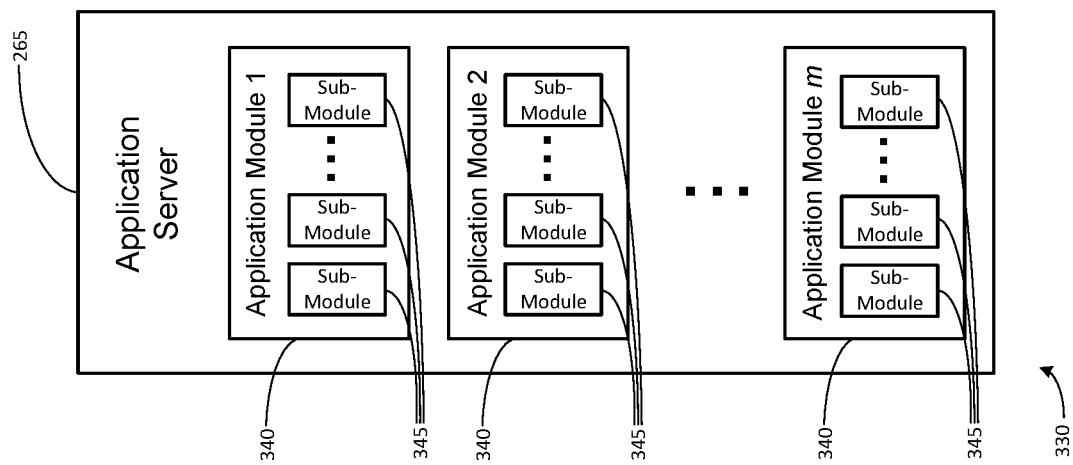
FIG. 3B illustrates additional details of the elements or components of an application server.
Figure 3A:
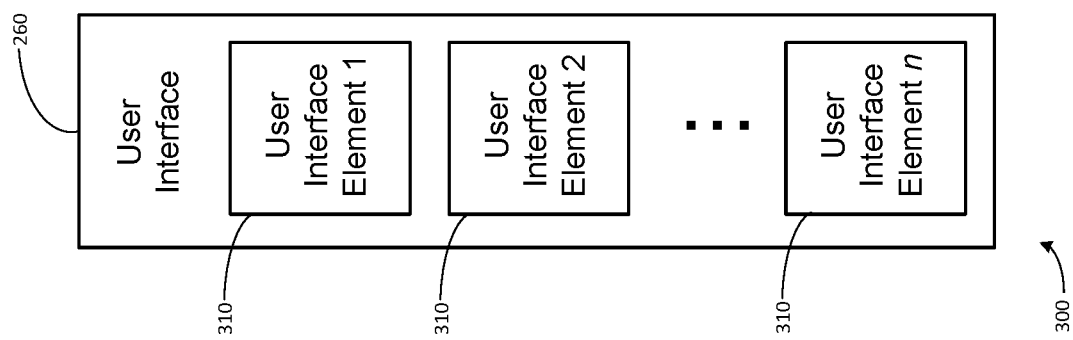
FIG. 3A illustrates additional details of the elements or components of a user interface.

FIG. 3A is a diagram illustrating additional details of the elements or components of the interface 260 first presented with reference to FIG. 2. Examples of interfaces 260 include graphical user interfaces (GUIs) and application programming interfaces (APIs). Each interface 260 may include one or more interface elements 310 (represented by "User Interface Element 1" . . . "User Interface Element n" in the figure). For example, users may interact with GUI interface elements in order to access functionality and/or data provided by application and/or data storage layers of the example architecture. GUIs may be local or remote. Examples of graphical user interface elements include buttons, menus, checkboxes, drop-down lists, scrollbars, sliders, spinners, text boxes, icons, labels, progress bars, status bars, toolbars, windows, hyperlinks, and dialog boxes. In another example, electronic devices may interact with API interface elements in order to access functionality and/or data provided by application and/or data storage layers of the example architecture. APIs are generally local, but may occasionally be remote. Examples of application programming interface elements include parameterized procedure calls, programmatic objects, and messaging protocols.

FIG. 3B is a diagram illustrating additional details of the elements or components of the application server 265 first presented with reference to FIG. 2. Application server 265 may include one or more application modules 340 (represented by "Application Module 1" . . . "Application Module 1 m" in the figure), each of which may have one or more sub-modules 345. Each application module 340 or sub-module 345 may correspond to a particular function, method, process, or operation that is implemented by the module or sub-module (for example, a function or process related to providing long-term maintenance predictions or another functionality to a user of the platform). Each application server 265 may include each application module. Alternatively, different application servers 265 may include different sets of application modules. Such sets may be disjoint or overlapping.

FIG. 3C is a diagram illustrating additional details of the elements or components of the data store 270, 275 first presented with reference to FIG. 2. Each data store 270, 275 may include one or more data objects 370 each having one or more data object components 375, such as attributes and/or behaviors. For example, the data store 270, 275 may correspond to a relational database, the data objects 370 may correspond to tables of the relational database, and the data object components 375 may correspond to columns or fields of such tables. Alternatively, or in addition, the data objects may correspond to data records having fields and associated services. Alternatively, or in addition, the data objects may correspond to persistent instances of programmatic data objects, such as structures and classes. Alternatively, or in addition, the data store 270, 275, data objects 370, and data object components 375 may each be any form of data structure as described herein. Each data store in the data storage layer may include each data object. Alternatively, different data stores may include different sets of data objects. Such sets may be disjoint or overlapping.

Example Method

Computer-implemented methods for long-term prediction of specific maintenance, and for various features related to such long-term prediction, are described herein. In one embodiment, a computing device (such as computer 05, shown and described with reference to FIG. 12) with operably connected processor (such as processor 1210) and memory (such as memory 1215) and other components may be configured with logic (such as long-term maintenance prediction logic 1230) that causes the computing device to perform steps of the method. For example, the processor accesses and reads from or writes to the memory to perform the steps shown and described with reference to FIG. 4. These steps may include (i) retrieving any necessary information, (ii) calculating, determining, generating, classifying, or otherwise creating any data, and (iii) storing any data calculated, determined, generated, classified, or otherwise created. In one embodiment, the methods described herein may be performed by the integrated application server 131.

In one embodiment, each subsequent step of a method commences in response to parsing a signal received or stored data retrieved indicating that the previous step has been performed at least to the extent necessary for the subsequent step to commence. Generally, the signal received or the stored data retrieved indicates completion of the previous step.

Figure 4:
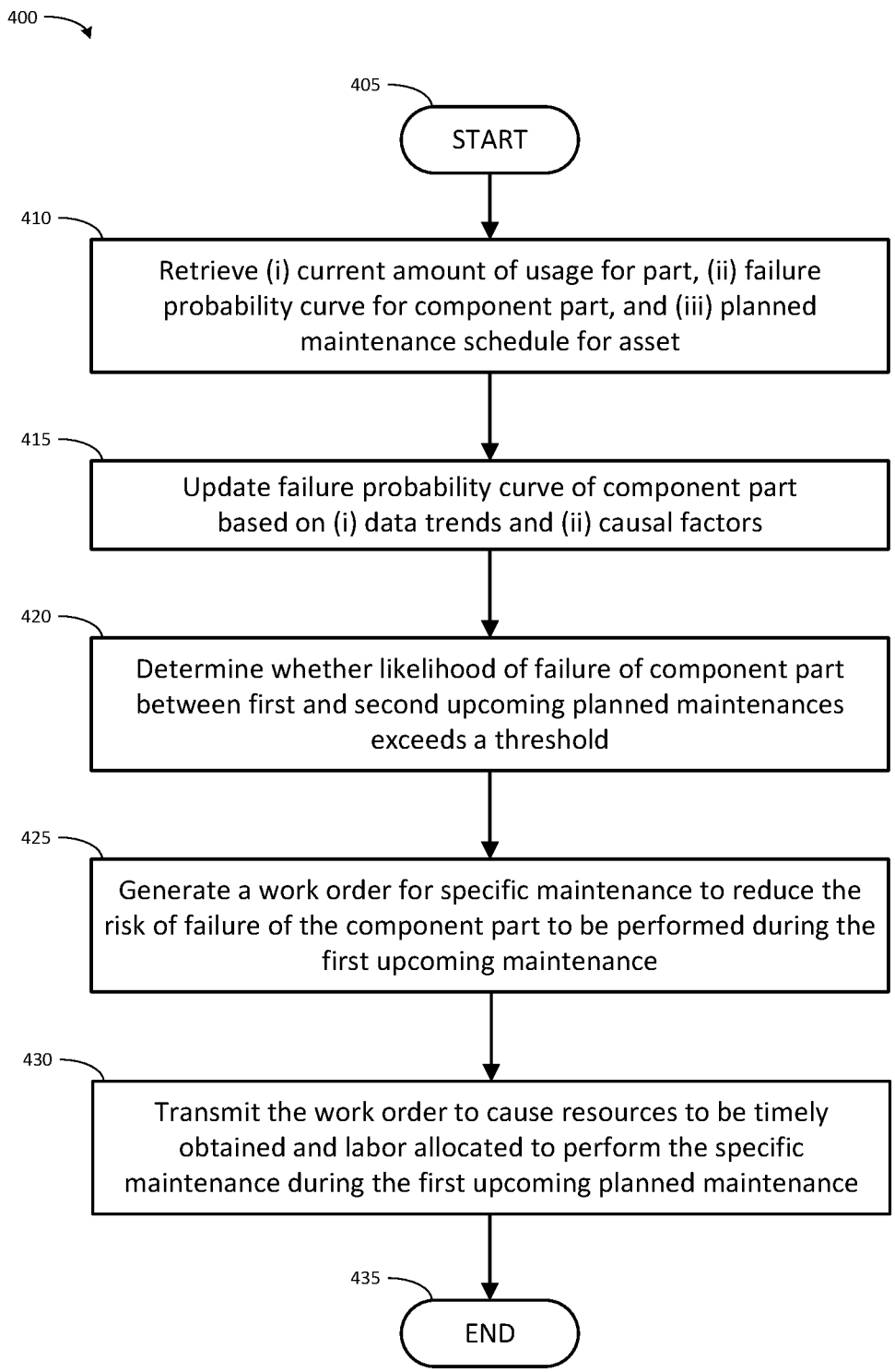
FIG. 4 illustrates one embodiment of a computer-implemented method associated with long-term specific maintenance prediction.

FIG. 4 shows one embodiment of a computer-implemented method 400 associated with long-term specific maintenance prediction. The method 400 describes steps for identifying a need for specific preventive maintenance to a component of an IOT-connected device sufficiently in advance of failure to allow preventive maintenance to be performed at the latest possible planned maintenance. In one embodiment, the steps of method 400 are performed by long-term prediction service 136.

The method 400 may be initiated based on various triggers, such as receiving a signal over a network or parsing stored data indicating that (i) a user (or administrator) of a maintenance prediction system (such as long-term specific maintenance prediction system 100 discussed herein with reference to FIG. 1) has initiated method 400, or (ii) that that method 400 is scheduled to be initiated at defined times or time intervals, for example a regular maintenance prediction run for a particular piece of equipment, or for all equipment associated with a facility. In some embodiments, the method is initiated on a periodic schedule (daily, weekly, bi-weekly, monthly, etc.) in accordance with trigger (ii) above. The method 400 initiates at start block 405 in response to parsing a signal received or stored data retrieved and determining that the signal or stored data indicates that the method 400 should begin. Processing continues to process block 410.

At process block 410, the processor retrieves (i) a current amount of usage for a component part of a device, (ii) a failure probability curve for the component part, and (iii) a planned maintenance schedule for the device. Here, the planned maintenance schedule includes at least a first upcoming planned maintenance and a second upcoming planned maintenance.

In one embodiment, the processor accesses a database associated with the maintenance cloud service 137 to retrieve at least one of calendar-based or meter-based usage information for a component part. In one embodiment, the usage information may be retrieved, at least in part, from a database associated with the IOT cloud service 135. The usage of the component part is calculated from at least one baseline event associated with the component part, such as initial installation of the device or last replacement, repair, or other service of the component part.

In the case of calendar-based usage information, the cumulative operating time for the component part is calculated from the baseline event. In one embodiment, the processor retrieves from an appropriate database (such as the database associated with the maintenance cloud service 137) at least the most recent baseline event for the component part. The processor retrieves timestamp of each "device turn on" and "device turn off" event following the most recent baseline event. From the timestamps, the processor calculates the cumulative operating time up to the present to determine the current amount of usage. In another embodiment, the cumulative operating time for the component part may be calculated from an earlier baseline event. In another embodiment, the calendar-based usage information disregards cumulative operating time, and the current amount of usage is simply the elapsed time from the baseline event to the present, without regard to whether the device is or is not operating.

In the case of meter-based usage information, the cumulative meter count for the component part is calculated from the baseline event. In one embodiment, the processor retrieves from an appropriate database (such as the database associated with the maintenance cloud service 137) at least the most recent baseline event for the component part, and the meter count for that event. The processor also retrieves the current meter count from the appropriate database. The processor then determines the change in meter count to determine the current amount of usage. In another embodiment, the change in meter count for the component part may be calculated from an earlier baseline event.

The current amount of usage for the component part is (whether calendar- or meter-based) is recorded in a data structure in a database associated with long-term prediction service 136.

In one embodiment, the processor also retrieves a failure probability curve for the component part of the device from a database associated with long-term prediction service 136. In one embodiment, the processor accesses the table of component-part types and associated failure curves maintained by long-term prediction service 136 and retrieves the associated failure curve for the type of the component part of the device. The processor assigns the retrieved failure curve to be the probability curve for the component part, and records the curve and assignment in a data structure in the database associated with long-term prediction service 136.

In one embodiment, the processor further retrieves a planned maintenance schedule for the device from a database associated with the maintenance cloud service 137. In one embodiment, the processor accesses the database of planned maintenance schedules maintained by the maintenance cloud service 137 and retrieves the maintenance schedule for the device. The processor records the maintenance schedule in a data structure in the database associated with long-term prediction service 136.

In one embodiment, the processor associates the current amount of usage for the component part of the device, the failure probability curve for the component part of the device, and the planned maintenance schedule for the device in a data structure in the database associated with long-term prediction service 136.

Once the processor has thus retrieved (i) the current amount of usage for the component part of the device, (ii) the failure probability curve for the component part, and (iii) the planned maintenance schedule for the device, processing at process block 410 completes, and processing continues to process block 415.

At process block 415, the processor updates the failure probability curve based at least in part on (i) trends of data obtained from sensors associated with the component part, and (ii) causal factors associated with the device.

In one embodiment, the processor updates the failure probability curve based on the trends of data obtained from sensors associated with the component part. This may be accomplished, for example, by updating a weight value that describes, at least in part, the failure probability curve. Where the update to the failure probability curve is based on the data trend(s), the processor updates a weight variable associated with the trend to reflect the trend. The processor determines at least one type of sensor data that indicates a condition of the component part. For one or more data entries of the at least one type of sensor data in a database of historical sensor data, the processor retrieves (i) a value of the sensor data for the data entry, and (ii) an amount of usage of the component part associated with the value of the sensor data. The processor determines the trend at least from the values of the sensor data and associated amounts of usage. The processor then determines that the trend indicates that, at the current amount of usage, the condition of the component part presents a trend-based likelihood of failure that differs from the value of the failure probability curve at the current amount of usage. In response to this determination, the processor updates a weight variable associated with the data trend to adjust the failure probability curve towards the trend-based likelihood of failure at the current amount of usage.

In one embodiment, the processor updates the failure probability curve based on the causal factors associated with the device. This may be accomplished, for example, by updating a weight value that describes, at least in part, the failure probability curve. Where the update to the failure probability curve is based on the causal factor(s), the processor updates a weight variable associated with the causal factor to reflect the influence of the causal factor. The processor accepts, following each of the prior maintenances in a set of one or more prior maintenances of the device (i) health check data describing a condition of the component part following completion of the prior maintenance where the prior maintenance was planned maintenance, and (ii) failure data indicating whether the component part had failed before the prior maintenance where the prior maintenance was reactive maintenance. Then, the processor updates the weight variable associated with the causal factor based at least in part on the accepted data.

Once the processor has thus updated the failure probability curve based at least in part on (i) the trends of data obtained from sensors associated with the component part, and (ii) the causal factors associated with the device, processing at process block 415 completes, and processing continues to process block 420.

At process block 420, the processor determines, based on the updated failure probability curve and the current amount of usage, that the likelihood of failure for the component part after the first upcoming planned maintenance and before the second upcoming planned maintenance exceeds a threshold.

In one embodiment, the processor parses the planned maintenance schedule for the device to identify the first upcoming planned maintenance and the second upcoming planned maintenance. As it may be desirable to defer maintenance until the risk of failure becomes unacceptable, in one embodiment, the processor examines each upcoming planned maintenance to determine if following the upcoming planned maintenance and before its immediately subsequent planned maintenance, the risk of failure of the component-part exceeds a predetermined 'acceptable' threshold. That is, the processor determines the latest upcoming planned maintenance after which the risk of failure of the component part becomes unacceptable. Once the processor identifies that last upcoming planned maintenance where the risk of failure is still acceptable, the processor stores it.

Until the processor determines that, for an upcoming planned maintenance and its immediately subsequent planned maintenance, the risk of failure exceeds the 'acceptable' threshold, the processor determines that the likelihood does not exceed the 'acceptable' threshold. In one embodiment, the planned maintenance schedule includes an earlier upcoming planned maintenance that precedes the first upcoming planned maintenance. Here, the method 400 may further include a step of determining, based on the updated failure probability curve and the current amount of usage, that the likelihood of failure for the component part after the earlier upcoming planned maintenance and before the first upcoming planned maintenance does not exceed the threshold.

Figure 5A:
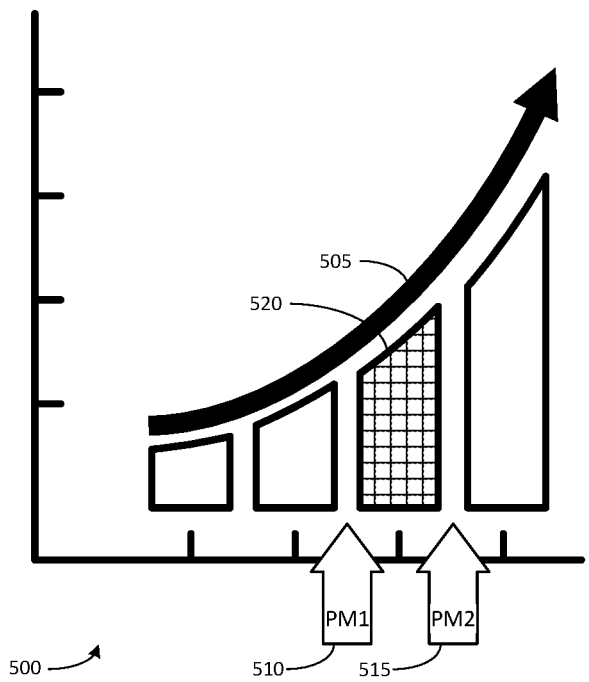
FIG. 5A illustrates a graph of a failure probability curve with the first upcoming planned maintenance and second upcoming planned maintenance bracketing the portion of the probability distribution where the risk of failure becomes unacceptable.

FIG. 5A shows a graph 500 of a failure probability curve 505 with the first upcoming planned maintenance 510 and second upcoming planned maintenance 515 bracketing the portion 520 of the probability distribution where the risk of failure becomes unacceptable. In this example, the processor examines the probability of failure 520 of the component part if it is not replaced, repaired, or otherwise serviced at first planned maintenance 510 to determine if it is tolerable. The processor calculates the probability represented by portion 520, for example by calculating the area of portion 520 to determine the probability of failure that this portion represents. The processor then compares the probability to the predetermined 'acceptable' threshold and determines that the probability exceeds the threshold and is unacceptable.

Figure 5B:
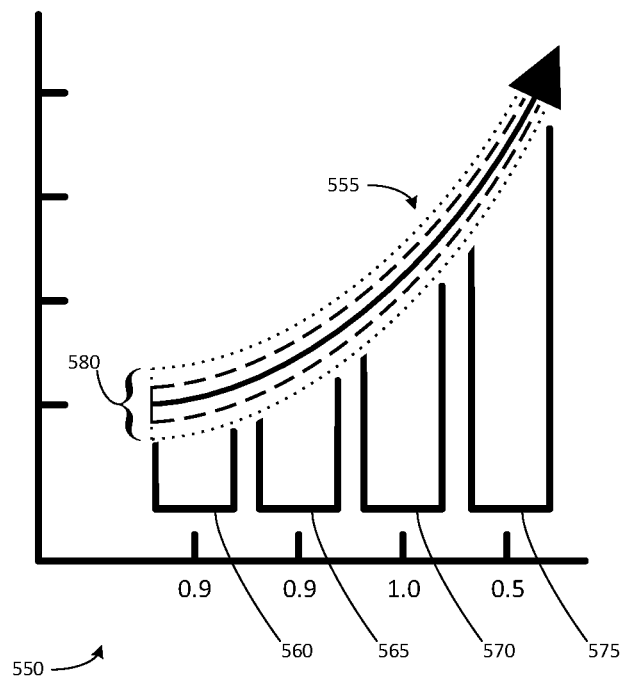
FIG. 5B illustrates a graph of a failure probability curve.

Referring now to FIG. 5B, the figure shows a graph 550 of a failure probability curve 555. The portions of the probability distribution 560-575 under the probability curve 555 need not be a crisp set. The portions of the probability distribution 560-575 may instead be a fuzzy set, where the values of the probability curve 555 bounding the probability distribution need not fall exactly along the probability curve 555, but fall approximately along it, as indicated by the ranges 580 along failure probability curve 555. The ranges 580 may illustrate a statistical bell curve of possible upper boundary values for the probability distribution under the probability curve 555. Member values may be updated based on feedback loops, as discussed elsewhere herein. Note that the example failure probability curves shown in FIGS. 5A-5B, 10A-10F, and elsewhere herein (such as curves 505 and 555) show simple-case, two-dimensional plots of probability curves as illustrative examples suitable for presentation in the line drawings of a patent figure. In one embodiment, the failure probability curve for a device is a multi-dimensional failure probability surfaces expressed in terms of the various causal factors associated with the device. The failure probability of a device with N causal factors may be expressed by an N-dimensional failure probability surface, but such surfaces are not suitable for presentation in the figures. For example, a failure probability for a device with five causal factors—such as age of the device, human operator, humidity, temperature, and dust—can be expressed with a 5-dimensional surface not readily shown by line drawings. For convenience, such multi-dimensional failure probability surfaces may be simply referred to as failure probability curves herein.

In one embodiment, current status readings at a time t for a set of N causal factors c1-cN is expressed as a multi-dimensional array of length N, $[c1_t, c2_t, \ldots, cN_t]$. In one embodiment, in response to receiving such status readings at time t, the processor creates an array of the readings at time t, and either stores the array as a data structure or provides the array as input to a failure probability function for evaluation.

Referring again to FIG. 4, once the processor has thus determined, based on the updated failure probability curve and the current amount of usage, that the likelihood of failure for the component part after the first upcoming planned maintenance and before the second upcoming planned maintenance exceeds the threshold, processing at process block 420 completes, and processing continues to process block 425.

At process block 425, the processor generates a work order for specific maintenance to reduce the risk of failure of the component part to be performed during the first upcoming planned maintenance.

In one embodiment, the processor creates a maintenance work order that includes the specific maintenance. For example, the maintenance work order may include the specific maintenance as a line item among other maintenance to be performed during the first upcoming planned maintenance. Alternatively, the maintenance work order may be for the specific maintenance alone. The work order may be a digital document, such as a .pdf or word file, a data structure, and/or a print file. In one embodiment, the work order generation may be performed by maintenance cloud service 137 using the library of standard maintenance operations and stored custom maintenance processes.

In one example, the specific maintenance indicated by the work order may be a health check for the component part, so that service technicians can inspect the component part to determine whether the component part requires replacement, repair, or other service before the next planned maintenance. In another example, the specific maintenance indicated by the work order may be a specific replacement, repair, or other service for the component part. In either event, as part of the work order generation, the processor also generates communications necessary or useful to ensure that correct parts, tools, and personnel are on hand during the planned maintenance to perform the specific maintenance. The processor may further generate updated pre-shift checklists for maintenance of the device. These checklists may include indications of priority for the specific maintenance, in one example highlighting the service that is more important for a device.

Once the processor has thus generated the work order for specific maintenance to reduce the risk of failure of the component part to be performed during the first upcoming planned maintenance, processing at process block 425 completes, and processing continues to process block 430.

At process block 430, the processor transmits the work order to cause resources to be timely obtained and labor allocated to perform the specific maintenance during the first upcoming planned maintenance.

In one embodiment, the processor transmits one or more of generated work order, the communications, and/or the checklists as emails, SMS messages, or other electronic messages to electronic devices associated with service technicians, procurement managers, or other personnel involved with the preventive maintenance process.

In one embodiment, the processor stores one or more of the generated work order, the communications, and/or the checklists as data structures in a database associated with the maintenance cloud system 137. The work order, communications, and/or checklists are later retrieved and transmitted to one or more computers of enterprise network 110 for display to service technicians, procurement managers, or other personnel involved with the preventive maintenance process using a GUI for interacting with the maintenance cloud system 137.

In one embodiment, the processor transmits the communications to other service modules 138 of the integrated application server 131. The communications are configured to cause those other service modules 138 to generate and issue purchase orders for parts and labor for the specific maintenance, requests for proposals to complete the specific maintenance, or other documents to facilitate the performance of the specific maintenance. For example, in one embodiment, the processor uses REST APIs of the maintenance cloud service 137 to transmit the work orders, communications, and/or checklists in to the maintenance cloud service 137.

In one embodiment, the communications include instructions for a robotic repair device to execute the repair, for example by replacing a failing modular component with a functional replacement. The processor transmits the communications to a controller of the robotic repair device.

In one embodiment, the processor transmits the communications (and, in one example, the work order and/or checklist) to a calendaring module of maintenance cloud system 137 for inclusion on calendars of service technicians, procurement managers, or other personnel involved with the preventive maintenance process.

Once the processor has thus transmitted the work order to cause the resources to be timely obtained and the labor allocated to perform the specific maintenance during the first upcoming planned maintenance, processing at process block 430 completes, and processing continues to END block 435 where processing completes.

In response to the work order, the service technicians will review the specific maintenance. The service technicians may determine that the component part is not yet in need of replacement, repair, or other service, for example as part of a health check or after commencing to perform the specific maintenance. The technicians will enter this information into the maintenance cloud service 137, causing further refinement of the failure probability curve for the component part. Or, if the impact of the failure of the component part is not critical to the operation of the device, the operator of the device may nevertheless choose to defer the recommended specific maintenance.

—Updating a Weight Variable for a Data Trend—

In one embodiment, the updating the failure probability curve further comprises updating one or more weight variables in a function that describes the failure probability curve. For example, updating the weight variables may include, where the update is based on a data trend, updating a weight variable associated with the data trend to reflect the data trend.

Figure 6:
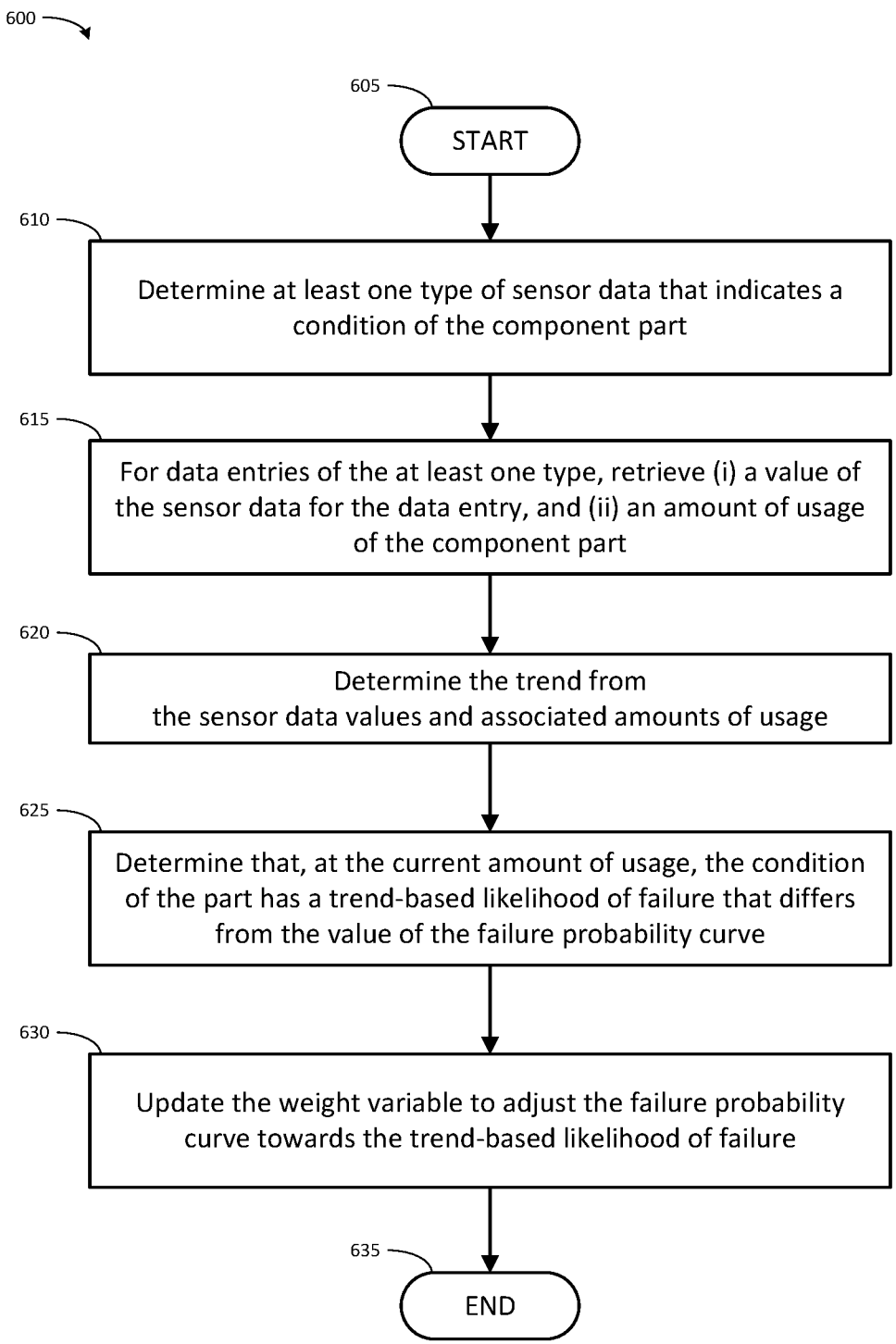
FIG. 6 illustrates one embodiment of a method for updating a weight variable associated with the data trend to reflect the data trend.

FIG. 6 shows one embodiment of a method 600 for updating a weight variable associated with the data trend to reflect the data trend. In one embodiment, the steps of method 600 are performed by long-term prediction service 136. The method 600 may be initiated based on various triggers, such as receiving a signal over a network or parsing stored data indicating that (i) a user (or administrator) of a maintenance prediction system has initiated method 600, or (ii) that that method 600 is scheduled to be initiated at defined times or time intervals, for example to keep up with current data trends. In one embodiment, method 600 is initiated on a periodic schedule in accordance with trigger (ii) above. In another embodiment, method 600 is initiated as part of a larger process, such as process block 415 of method 400. The method 600 initiates at start block 605 in response to parsing a signal received or stored data retrieved and determining that the signal or stored data indicates that the method 600 should begin. Processing continues to process block 610.

At process block 610, the processor determines at least one type of sensor data that indicates a condition of the component part.

In one embodiment, the processor looks up a component type for the component part in a database associated with long-term prediction service 136. When the component type for the component part is located, the processor retrieves a list of types of sensor data that indicate effects on component parts of that component type. The processor stores these retrieved component types.

Once the processor has thus determined the at least one type of sensor data that indicates a condition of the component part, processing at process block 610 completes, and processing continues to process block 615.

At process block 615, for data entries of the at least one type, the processor retrieves (i) a value of the sensor data for the data entry, and (ii) an amount of usage of the component part associated with the value of the sensor data.

In one embodiment, the processor queries historical sensor readings that are associated with the component part and that are of the type(s) of sensor data determined in the previous step (at process block 610) from the database associated with IOT cloud service 135. For each data entry in the historical sensor readings satisfying the query, the processor retrieves the value of the sensor data recorded in that entry and the usage information (time stamp or metric count) at which the sensor reading was taken. The processor stores these values and usage information.

The query of historical sensor readings may be further limited to a specific time range or metric count range. (For example, the query may be limited to historical sensor readings during the time period from the most recent planned maintenance to the present, although other ranges may also be appropriate).

In one embodiment, the historical sensor readings for the causal factors may be readings taken solely by IOT or other sensors. In another embodiment, the historical sensor readings may include manually entered readings for one or more of the causal factors, for example where sensor-based readings are unavailable. In another embodiment, the historical sensor readings may be entirely manually-entered readings, for example where technical limitations or security concerns prevent installation of IOT or other sensors.

Once the processor has thus retrieved, for the data entries of the at least one type, (i) the value of the sensor data for the data entry, and (ii) the amount of usage of the component part associated with the value of the sensor data, processing at process block 615 completes, and processing continues to process block 620.

At process block 620, the processor determines the trend at least from the values of the sensor data and associated amounts of usage.

In one embodiment, the processor analyzes the retrieved historical sensor values and usage information from the previous step (process block 615) to determine a rate of change over a given range of usage. For example, this may be formed by fitting a curve to a plot of the historical sensor values against their respective amounts of usage and finding a slope of the curve over the given range of usage. The processor stores this rate of change as indicating the trend.

The processor also determines and stores the rate of change in the failure probability curve for the component part over the given range of usage.

Once the processor has thus determined the trend at least from the values of the sensor data and associated amounts of usage, processing at process block 620 completes, and processing continues to process block 625.

At process block 625, the processor determines that the trend indicates that, at the current amount of usage, the condition of the component part presents a trend-based likelihood of failure that differs from the value of the failure probability curve at the current amount of usage.

In one embodiment, the processor compares the rate of change that indicates the trend over the given range of usage to the rate of change of the failure probability curve for the component part over the given range of usage. If the two rates differ by more than a pre-determined threshold amount, the processor determines that the condition of the component part presents a likelihood of failure different than that predicted by the failure probability curve. These threshold values can be set by part histories based on qualitative parameters. If the two rates do not differ by more than the threshold amount, the processor determines that the condition of the component part does not present a likelihood of failure different than that predicted by the failure probability curve.

Once the processor has thus determined that the trend indicates that, at the current amount of usage, the condition of the component part presents the trend-based likelihood of failure that differs from the value of the failure probability curve at the current amount of usage, processing at process block 625 completes, and processing continues to process block 630.

At process block 630, the processor updates the weight variable associated with the data trend to adjust the failure probability curve towards the trend-based likelihood of failure at the current amount of usage.

In one embodiment, the processor updates the weight variable associated with the data trend by replacing its current weight value with a new weight value. The new weight value is the rate of change that indicates the trend (from sensor data) over the given range of usage divided by the rate of change of the failure probability curve for the component part over the given range of usage. This weight variable is applied as a multiplicative weight to the formula for the failure probability curve to adjust the failure probability curve towards the trend-based likelihood of failure In one embodiment, the formula for this update to the probability curve is given by the following equation:

$$P_{new}(\text{Failure in Period } t) = P_{original}(\text{Failure in Period } t) * \left(\frac{\Delta_{Sensor}}{\Delta_{Curve}}\right) \quad \text{(Eq. 3)}$$

where the given range of usage is expressed as a period of time t. In another embodiment, another measure of usage, such as a given metric count range, may substitute for the given time period in the updating the probability curve discussed above.

The processor replaces the original probability curve for the component part with the new probability curve. Thus, the failure probability curve is updated to be weighted more heavily or lightly based on observed sensor data. In one embodiment, the replacement is cumulative over multiple iterations of the update process, such that as additional weights based on sensor/curve changes are applied to the formula, the failure probability curve is fine-tuned to the actual performance of the specific component part in the device.

Once the processor has thus updated the weight variable associated with the data trend to adjust the failure probability curve towards the trend-based likelihood of failure at the current amount of usage, processing at process block 630 completes, and processing continues to END block 635 where processing completes.

—Updating a Weight Variable for a Causal Factor—

In another example, updating the weight variables may include, where the update is based on causal factors, updating a weight variable associated with the causal factor to reflect the influence of the causal factor.

Figure 7:
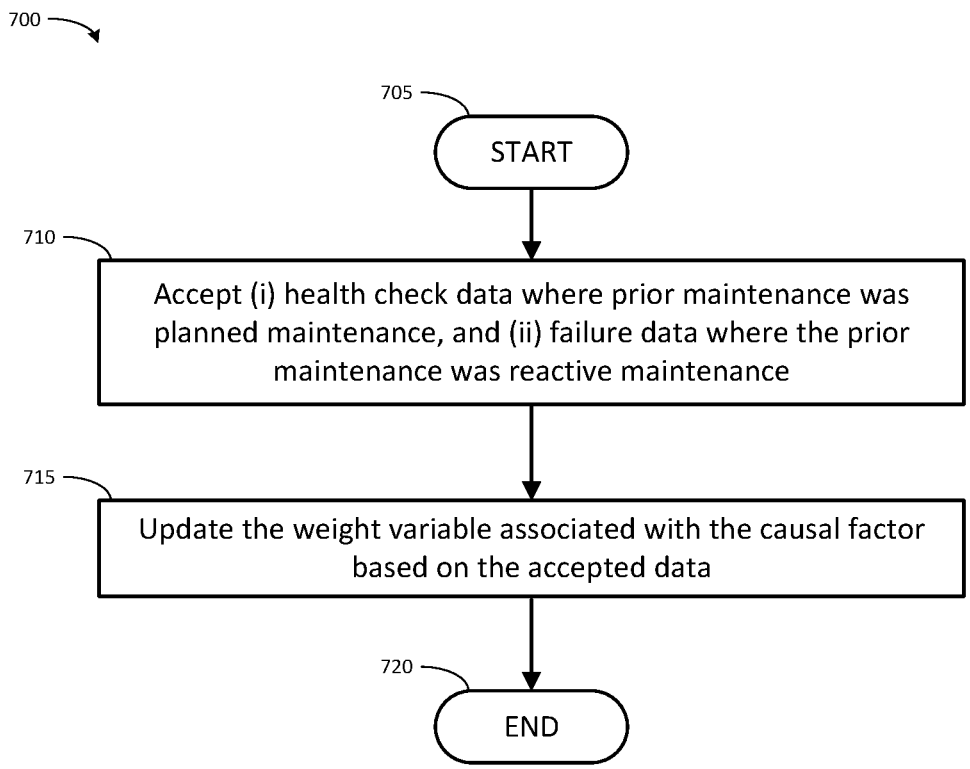
FIG. 7 illustrates one embodiment of a method for updating a weight variable associated with the causal factor to reflect the influence of the causal factor.

FIG. 7 shows one embodiment of a method 700 for updating a weight variable associated with the causal factor to reflect the influence of the causal factor. In one embodiment, the steps of method 700 are performed by long-term prediction service 136. The method 700 may be initiated based on various triggers, such as receiving a signal over a network or parsing stored data indicating that (i) a user (or administrator) of a maintenance prediction system has initiated method 700, or (ii) that that method 700 is scheduled to be initiated at defined times or time intervals, for example to adjust for a different causal factor, such as a particular operator of equipment or an operating environment for the equipment. In one embodiment, method 700 is initiated on a periodic schedule in accordance with trigger (ii) above. In another embodiment, method 700 is initiated as part of a larger process, such as process block 415 of method 400. The method 700 initiates at start block 705 in response to parsing a signal received or stored data retrieved and determining that the signal or stored data indicates that the method 700 should begin. Processing continues to process block 710.

At process block 710, the processor accepts, following each of the prior maintenances in a set of one or more prior maintenances of the device, (i) health check data describing a condition of the component part following completion of the prior maintenance where the prior maintenance was planned maintenance, and (ii) failure data indicating whether the component part had failed before the prior maintenance where the prior maintenance was reactive maintenance.

Health check and failure data are entered into the maintenance cloud service 137 by service technicians following a planned or reactive maintenance, respectively. A GUI specifically configured to capture this information may be transmitted to an electronic device associated with the service technician for display. The service technician enters the health check or failure data using the GUI. The electronic device transmits the health check or failure data to the maintenance cloud service 137 through the web interface server 132. The processor parses the health check and/or failure data to determine a condition (including failure status) of the component part.

Once the processor has thus accepted, following each of the prior maintenances in the set of one or more prior maintenances of the device, (i) the health check data describing a condition of the component part following completion of the prior maintenance where the prior maintenance was planned maintenance, and (ii) the failure data indicating whether the component part had failed before the prior maintenance where the prior maintenance was reactive maintenance, processing at process block 710 completes, and processing continues to process block 715.

At process block 715, the processor updates the weight variable associated with the causal factor based at least in part on the accepted data. In one embodiment, the processor updates the weight variable associated with the causal factor by replacing its current weight value with a new weight value. The new weight value is a rate of change that indicates the trend in observed health condition of the component part over the given range of usage divided by the rate of change of the failure probability curve for the component part over the given range of usage. (Note that here, observed health condition may include an observation of failure of the component.) This weight variable is applied as a multiplicative weight to the causal factor in the formula for the failure probability curve to adjust the failure probability curve towards the trend-based likelihood of failure In one embodiment, the formula for this update to the probability curve is given by the following equation:

$$P_{new}(\text{Failure in Period } t \text{ for causal factor } X) = \qquad (Eq. 4)$$
$$P_{original}\left(\text{Failure in Period } t \text{ for causal factor } X * \left(\frac{\Delta_{Health}}{\Delta_{Curve}}\right)\right)$$

where the given range of usage is expressed as a period of time t. In another embodiment, another measure of usage, such as a given metric count range, may substitute for the given time period in the updating the probability curve discussed above.

The processor replaces the original probability curve for the component part with the new probability curve. Thus, the weight of the causal factor in the failure probability curve is updated to be weighted more heavily or lightly based on observed health condition data. In one embodiment, the replacement is cumulative over multiple iterations of the update process, such that as additional weights based on sensor/curve changes are applied to the formula, the failure probability curve is fine-tuned to the actual performance of the specific component part in the device.

Once the processor has thus updated the weight variable associated with the causal factor based at least in part on the accepted data, processing at process block 715 completes, and processing continues to END block 720 where processing completes.

In one embodiment, the method 400 may further include generating the failure probability curve for the component part based at least in part on (i) maintenance data describing the condition of other component parts at an associated maintenance of the other parts, and (ii) sensor data associated with the operation of the other component parts. Here, the other component parts are of the same type as the component part.

Example Device Setup

Figure 8:
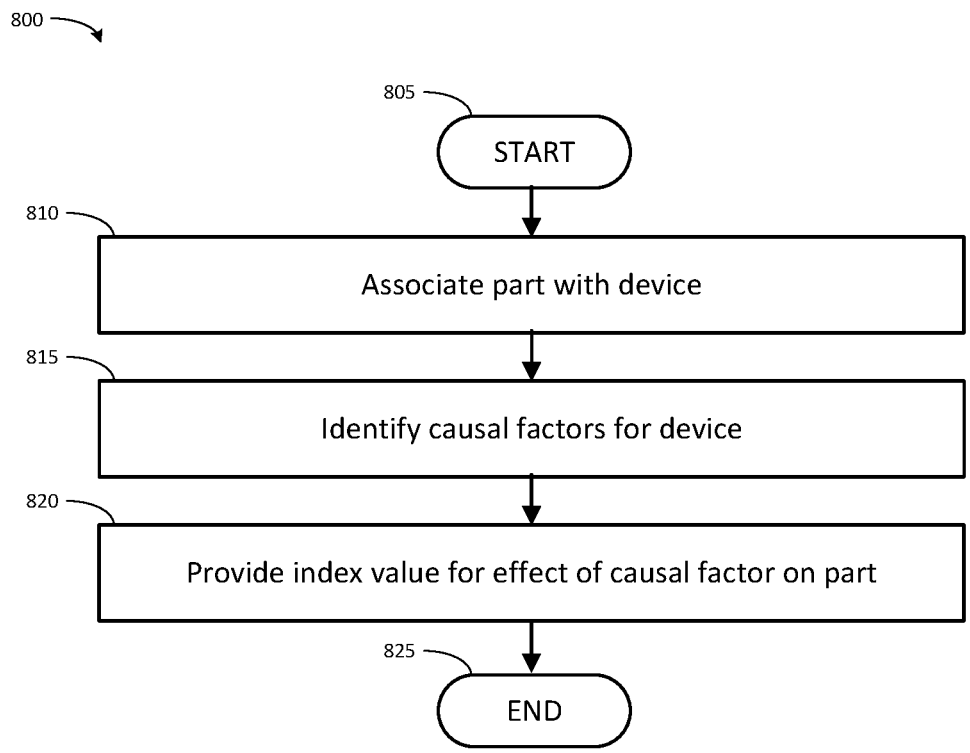
FIG. 8 illustrates one embodiment of a configuration process associated with long-term specific maintenance prediction.

In one embodiment, the method 400 may be preceded by a configuration process. FIG. 8 shows one embodiment of a configuration process 800 associated with long-term specific maintenance prediction. In one embodiment, the steps of configuration process 800 are performed by long-term prediction service 136. In one embodiment, prior to operation of the maintenance prediction system, a device (such as a machine or piece of equipment) for which maintenance will be predicted is mapped. Each component part of the system is listed, and assigned a failure probability curve.

The configuration process 800 may be initiated based on various triggers. Most commonly, that trigger may be receiving a signal over a network or parsing stored data indicating that a user (or administrator) of a maintenance prediction system has initiated method 800. This may be done, for example, to add a new device about which the method 200 (described with reference to FIG. 2 above) can be used to make long-term maintenance predictions. The method 800 initiates at start block 805 in response to parsing a signal received or stored data retrieved and determining that the signal or stored data indicates that the method 800 should begin. Processing continues to process block 810.

At process block 810, the processor associates each component part of the device with the device. Each device (machine) is fully mapped at this stage. Each component part of the device is assigned a probability of failure curve.

Figure 9:
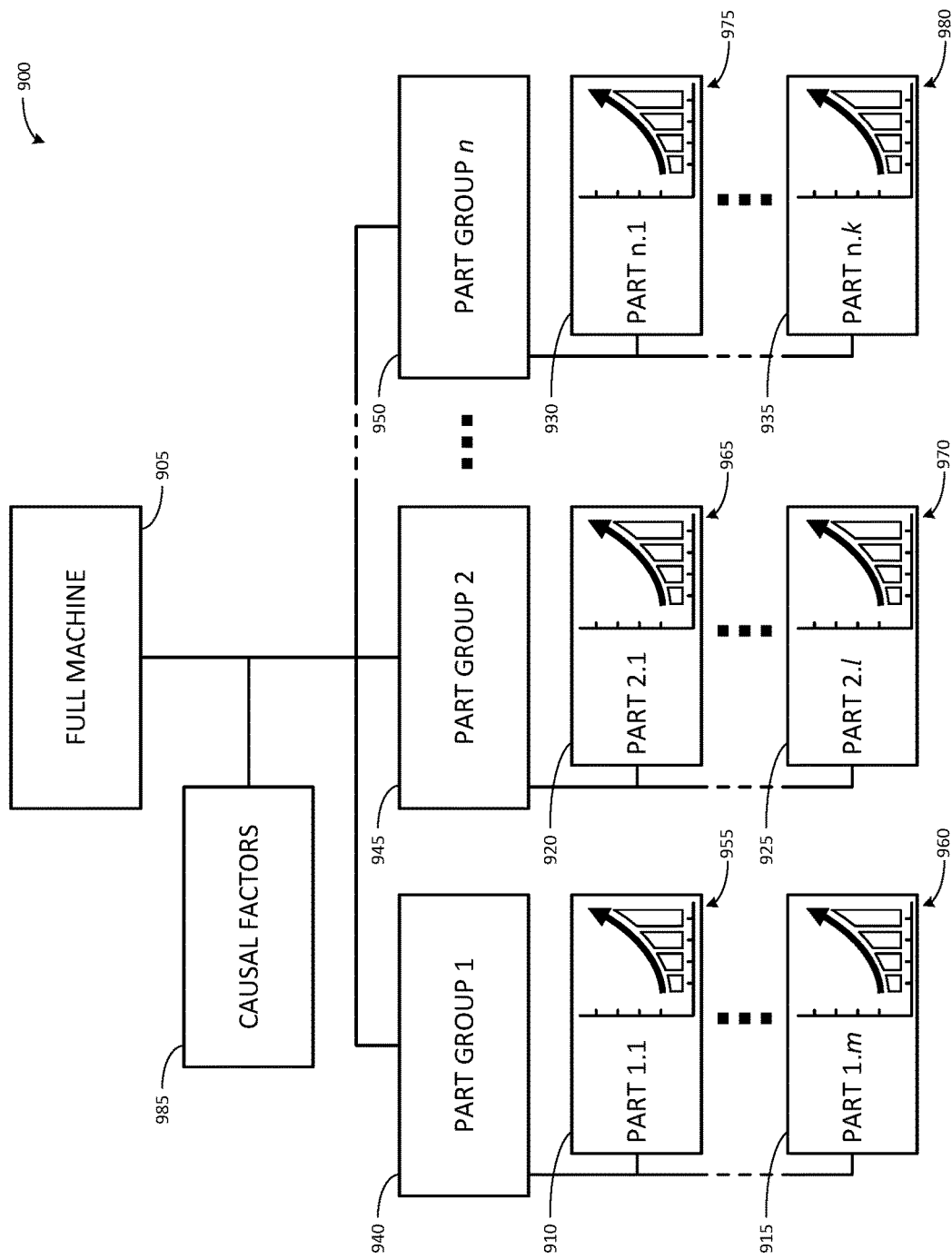
FIG. 9 illustrates a mapping of an example device made up of component parts.

Consider for example a mapping 900 of an example device 'full machine' shown in FIG. 9. The figure represents a data structure describing the full machine. In this example, full machine 905 is represented at the top of the hierarchy. The full machine is made up of component parts, which are represented as the bottom of the hierarchy by of component parts 910-935. Between the top level full machine 905 and the bottom level component parts 910-935, the component parts may be subdivided in to one or more part groups 940-950. While, for simplicity, there is only one level of part groups shown in FIG. 9 (part groups 940-950), additional sub-levels of part groups may be included in the mapping. Similarly, the component parts need not necessarily belong to a part group or part subgroup, but may be ungrouped and simply be a component part of the full machine 905.

Generally, for the purposes of this system, a component part is a lowest level replaceable or serviceable component. For example, a component part may be a bolt, a bearing, a motor, a brake pad, a pump, a belt, a sensor, etc. As a practical matter, the degree of complexity of what constitutes a component part varies based on the application of the machine and the desires of the user. For example, an electric motor may be considered to be a component part. Or, an electric motor may be considered to be a part group, and the bearings, brushes, and windings of the motor may be considered to be component parts. Whether the user chooses to consider the motor to be the lowest level component part, or a higher level part group depends on the choice of the user.

Considering the number of possible component parts in even a fairly simple device, it will be understood that the mapping of the full machine 905 can become so large as to be beyond human memory. And, as the machine becomes even moderately complex, the mapping can become so large as to be beyond the ability to represent in an efficient and accessible manner outside of a computerized environment.

The system may perform the association of component parts with a full machine, at least in part, by accepting inputs of a user through a picking graphical user interface (picking GUI) for picking a digital representation of each component part of full machine 905 from a database of component parts and associating the digital representations of the parts with full machine 905 and with one or more part groups 940-950. The system may also perform the association, at least in part, by accepting inputs of the user through the picking GUI for selecting digital representations of pre-configured part groups from a database of component parts and associating the digital representations of the parts with full machine 905. The pre-configured part groups include, for each part group, digital representations of all component parts included in the part group. The pre-configured part groups may also be included in the database of component parts. The system may also perform the association, at least in part, by accepting inputs of the user that cause the system to import (i) a digital representation of one or more component parts, (ii) a digital representation of one or more part groups, and/or (iii) a digital representation of the full machine 905, from another computing system accessible through a network and associating them, as appropriate, with full machine 905. The association may also be performed by combinations of these methods. After accepting such an input, the system writes or modifies a data structure that forms the association in memory for later retrieval.

In one embodiment, the digital representations of component parts are data structures that describe characteristics of the component part. For example, the digital representation may include:

human language description of the component part, for example, "1" Length #8-32 Round Philips Head Zinc-Plated Carbon Steel Machine Screw,"
an identifier for the manufacturer of the component part,
an identifier describing the type of the component part, such as a manufacturer model number, for example, "RPZMS83288,"
a unique identifier describing a particular instance of the digital representation of the component part,
one or more identifiers of full machines or part groups with which the component part is associated (these values may be null before association)
one or more numerical values representing technical specifications of the component part, for example, "driver size: #2, head diameter: 0.309", head height: 0.120", tensile strength: 60,000 PSI,"
one or more values indicating compliance of the component part with one or more standards, and/or
one or more metering variables for tracking the use of the component part, such as installation date, last service date, count of use cycles, or other metrics.

Digital representations of part groups and of full machines are data structures which may also include similar characteristics.

In one embodiment, each component part of the device is also assigned a probability of failure curve 955-980. The probability of failure curve describes the probability of failure of the component part measured against some usage metric, such as time or use cycles from installation or last service. This probability of failure curve is desirably as specific as possible to the part type and manufacturer of the component part, which enhances initial accuracy of prediction. But, if no reference is available, a generic curve may be assigned to the component part.

Figure 10A:
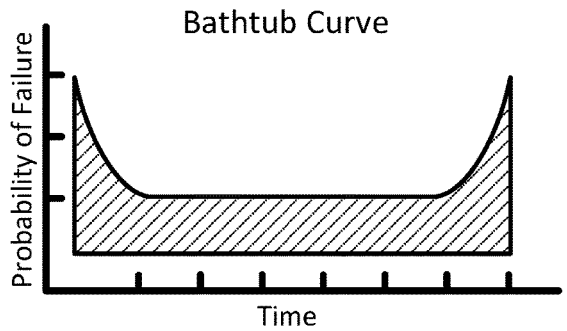
FIG. 10A illustrates a 'bathtub curve' for probability of failure.
Figure 10D:
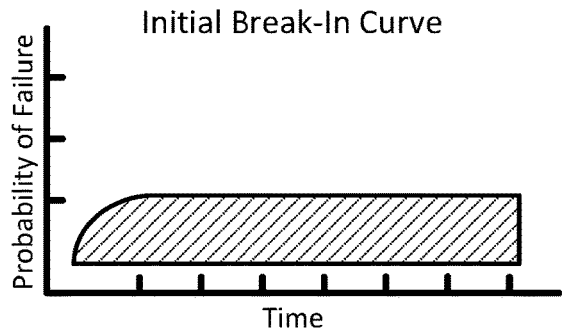
FIG. 10D illustrates an 'initial break-in curve' for probability of failure.
Figure 10B:
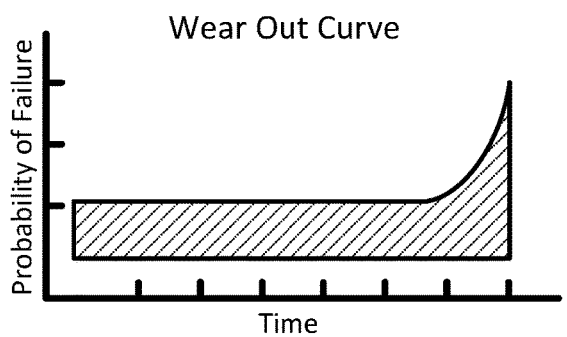
FIG. 10B illustrates a 'wear out curve' for probability of failure.
Figure 10E:
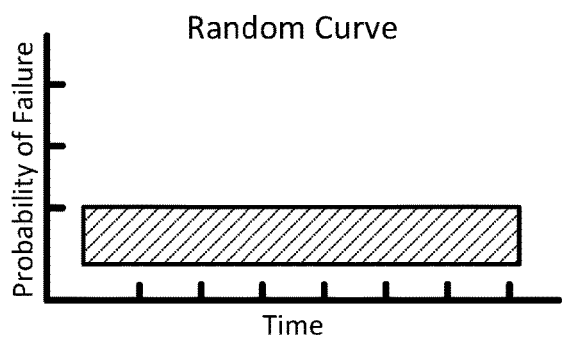
FIG. 10E illustrates a 'random curve' for probability of failure.
Figure 10C:
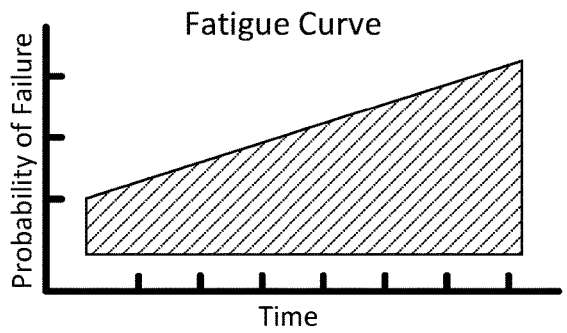
FIG. 10C illustrates a 'fatigue curve' for probability of failure.
Figure 10F:
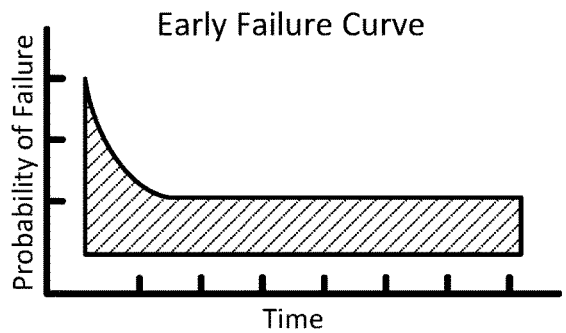
FIG. 10F illustrates a 'early failure curve' for probability of failure.

Different types of component parts are subject to different forms of failure probability curves. Different forms of failure probability curves include at least:

a "bathtub curve," where there is a high probability of failure when the component part is new, followed by a low probability of random failures during the working life of the component part, and a high probability of failure as the component part approaches the end of its working life (shown at FIG. 10A);

a "wear out curve," where there is a low probability of random failures from the time the component part is new through the working life of the component part, and a high probability of failure as the component part approaches the end of its working life (shown at FIG. 10B);

a "fatigue curve," where the probability of failure gradually increases over the working life of the component part (shown at FIG. 10C);

an "initial break-in curve," where there is a very low probability of failure when the component part is new, followed by a sharp rise to a constant probability of random failure for the remaining working life of the component part (shown at FIG. 10D);

a "random curve," where there is a constant probability of random failure across the working life of the component part (shown at FIG. 10E); and the "early failure curve," where there is a high probability of failure when the component part is new, followed by a fall to a constant probability of random failure for the remaining working life of the component part (shown at FIG. 10F).

Further, the failure probability curve of a component part may be a composites of one or more of the above types of curves. While failure probability curves may generally be of one of the forms described above or be specific to a device or component part, for convenience, a generic probability curve similar to that shown in FIG. 5A is shown throughout the figures.

A specific failure probability curve for a particular type of component parts may be derived from aggregate failure data for component parts of that type. The failure data may be obtained by testing of the component part, for example, by the manufacturer of the component parts, or by independent testing laboratories. Test failure data may be transmitted over a network to a computing system that stores failure data. The failure data may also be obtained from reporting of real-world failures of the component parts. Real-world failure data may be transmitted over a network to the computing system that stores the failure data. Where the component parts are associated with IOT sensors that are able to detect the failure of the component part, the failure data for storage may be received over the network at least in part from the IOT sensors. The failure data for storage may also be received over a network at least in part from interfaces of Maintenance Cloud Service 115 that are configured to accept user reporting of the results of planned and reactive maintenance associated with the component part. Such reporting may include the failure data. Regardless of the source of the failure data, the failure data may be stored in one or more databases maintained by (i) the manufacturer of the component part, (ii) the independent testing laboratories, (iii) the IOT cloud service 110 (such as IOT Cloud Service database 131) and/or (iv) Maintenance Cloud Service 115 (such as Maintenance Cloud Service database 132).

In one embodiment, the manufacturer of component parts may develop and provide failure probability curves for the component parts that they provide. The system may then retrieve the manufacturer-provided failure probability curves over a network from a remote computer system associated with the manufacturer. Alternatively, the system may retrieve the manufacturer-provided failure probability curves from a computer-readable medium provided by the manufacturer.

In another embodiment, the operator of the long-term specific maintenance prediction system 100 may develop and provide failure probability curves for the component parts that are used with the long-term specific maintenance prediction system 100.

In another embodiment, the long-term specific maintenance prediction system 100 itself derives the failure probability curves from failure data for the component parts, with the failure data retrieved from the computer system of the manufacturer or from the manufacturer-supplied computer-readable medium.

In another embodiment, where the component part has no historic failure data from which a failure probability curve can be derived (for example when the component part is of a new design) the maintenance prediction system 100 may assign a failure probability curve of another component part that is similar in nature to the component part. Feedback updates to the assigned curve based on ongoing readings and failure events will eventually cause the assigned curve to conform to the observed behavior of the component part (as discussed elsewhere herein).

Further, the operator of the long-term specific maintenance prediction system 100 has access to failure data for the component part across multiple tenants (or customers) of the long-term specific maintenance prediction system 100 (or tenants of the separate IOT cloud service 110 or maintenance cloud service 115). The failure data for the component part, aggregated across multiple (or all) tenants, provides a more robust data set from which the failure curves may be derived.

In one embodiment, the failure probability for a component part A (or device) for any combination of N causal factor readings may be expressed by the following function:

$$P(\text{Failure of Part } A) = F_{u1,v1,\ldots,w1}\left(\frac{1}{1 + e^{-(a+bx)}}\right) \quad \text{(Eq. 2)}$$

where u-w and x are causal factor readings and u1-w1 are specific readings for those causal factors (for example at time t).

The processor then fits the historical failure data for the component part to the failure curve expressed by Eq. 2 for each of the causal factors u-w where P(Failure of Part A)=1 (100%) to derive the failure probability function. In one embodiment, the processor parses the failure data for the component part to extract the specific readings for causal factors u-x for the component part. The processor then performs a regression analysis on the set of specific readings for the causal factors u-x to derive the failure probability function P(Failure of Part A).

In one embodiment, the manufacturer of component parts may develop and provide failure probability curves for the parts that they provide. In another embodiment, the Long-term Prediction Service 105 may generate the failure probability curve from historical data regarding maintenance and failure related to the component part.

While the mapping is shown here as a hierarchical chart, the mapping is implemented, in one embodiment, as a set of one or more data structures describing the mapping, for example as data entries in long-term prediction database 130.

Referring again to FIG. 8, once the processor has thus associated each component part of the device with the device, processing at process block 810 completes, and processing continues to process block 815.

At process block 815, the processor identifies the causal factors associated with the device.

In one embodiment, the processor retrieves a list of causal factors that affect devices of the same type as the device from a database associated with long-term prediction service 136, and associates these causal factors with the device. In another embodiment, the processor may retrieve lists of causal factors that affect each of the types of component part included in the device. The processor then assembles the list based on the retrieved lists of causal factors for the component parts. In either event, the causal factors for the device are stored.

Example causal factors include, but are not limited to, human operators of the device, interdependencies between parts of the device, usage or non-usage of the device, nature of jobs performed by the device, age of the device, weather and environment around the device, and all recordable aspects of an asset, its operation, and the maintenance interventions others.

Once the processor has thus identified the causal factors associated with the device, processing at process block 815 completes, and processing continues to process block 820.

At process block 820, the processor provides an index value for each component part indicating the effect of each causal factor on the probability of failure for that component part.

In one embodiment, values for each of the causal factors are retrieved from the various modules of integrated application server 131. The causal factors are determined for the component part based on asset configuration. In one embodiment, all factors under which the machine (or component part) is operating that can be sensed or recorded may be assigned to be the causal factors for the machine (or component device). In another embodiment, a few, 'most significant' factors under which the machine (or component part) is operating may be selected to be the causal factors for the machine (or component device).

Once the processor has thus provided an index value for each component part indicating the effect of each causal factor on the probability of failure for that component part, processing at process block 820 completes, and processing continues to END block 825 where processing completes.

—Some Benefits of the Claimed Systems and Methods—

Implementing the systems and methods for long-term prediction for specific maintenance has a number of benefits. For example, unplanned outages in devices and the attendant reactive maintenance are reduced. Also, even where needed maintenance is predicted, the long-term prediction allows the maintenance to take place in the planned preventive maintenance before the predicted maintenance is required. This avoids taking the device out of service outside of the scheduled planned maintenance cycle (such as a monthly, fortnightly, or weekly cycle).

Further, the system automates systemic learning of the performance of specific component parts, in a specific device, under specific conditions (causal factors) in a way that exceeds human capability to learn to maintain a device. Reliance on human memory and human familiarity with a device are reduced, if not eliminated, in the device maintenance process.

Further, over time, the system develops a robust, accurate, cross-tenant body of component part performance information. This cross-tenant body of component part performance information can be leveraged internally by the operators of the system to make the performance information for individual tenants more accurate. The cross-tenant body of component part performance information can also be offered externally as Data-as-a-Service. Sharing the cross-tenant body of component part performance information may also induce other companies, including competitors, to similarly share their component-part failure data.

A device maintenance function is described on a continuum of balancing the costs of device maintenance against ensuring device availability. The function may place greater emphasis on device availability or on maintenance cost savings, as may be determined by the operator of the device. For example, a high availability focus results in performing a greater amount of maintenance on the device. High availability focus may involve generating and completing maintenance work orders for the device more often. Alternatively, a high cost focus results in a greater risk of device (equipment) failure, service disruption, and increased equipment replacement. A high cost focus may involve generating and completing fewer maintenance work orders for the device. In one embodiment, implementing a system or method for long-term predictions for specific maintenance using feedback loops improves the device maintenance function, reducing maintenance costs while enhancing device availability.

Figure 11A:
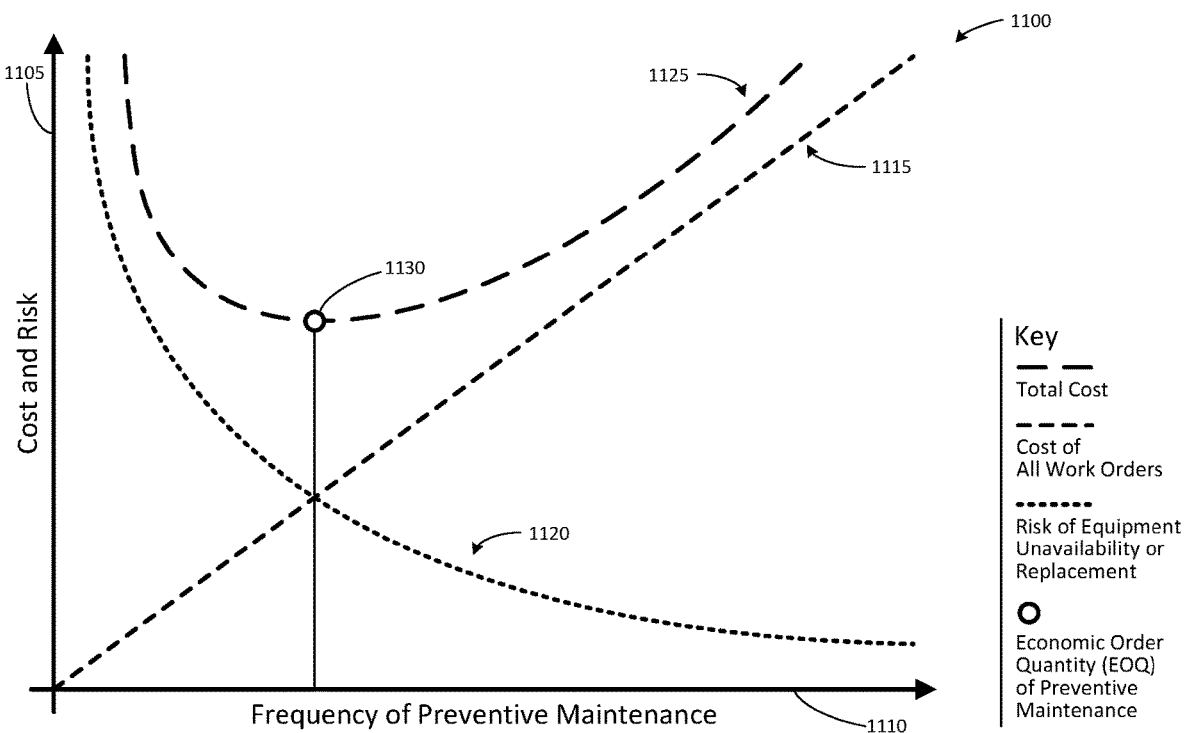
FIG. 11A shows a graph plotting functions of cost or risk against the frequency of preventive maintenance.

Referring now to FIG. 11A, a graph 1100 for plotting functions of cost or risk 1105 (as shown on a first axis) against the frequency of preventive maintenance 1110 (as shown on a second axis). An example function of cost of all maintenance work orders against the frequency of preventive maintenance 1115 is plotted on the graph 1100. An example function of the risk of device (equipment) unavailability or replacement against the frequency of preventive maintenance 1120 is also plotted on the graph 1100. An example function of the total cost of device maintenance against the frequency of preventive maintenance 1125 is further plotted on the graph 1100. The cost of a frequency of maintenance required to maintain a given acceptable risk of device (equipment) unavailability or replacement while minimizing the cost of maintenance is denoted by Economic Order Quantity (EOQ) point 1130. (The term Economic Order Quantity is borrowed from the field of logistics where it describes the volume and frequency of orders required to satisfy a given level of demand while minimizing the cost per order.)

Figure 11B:
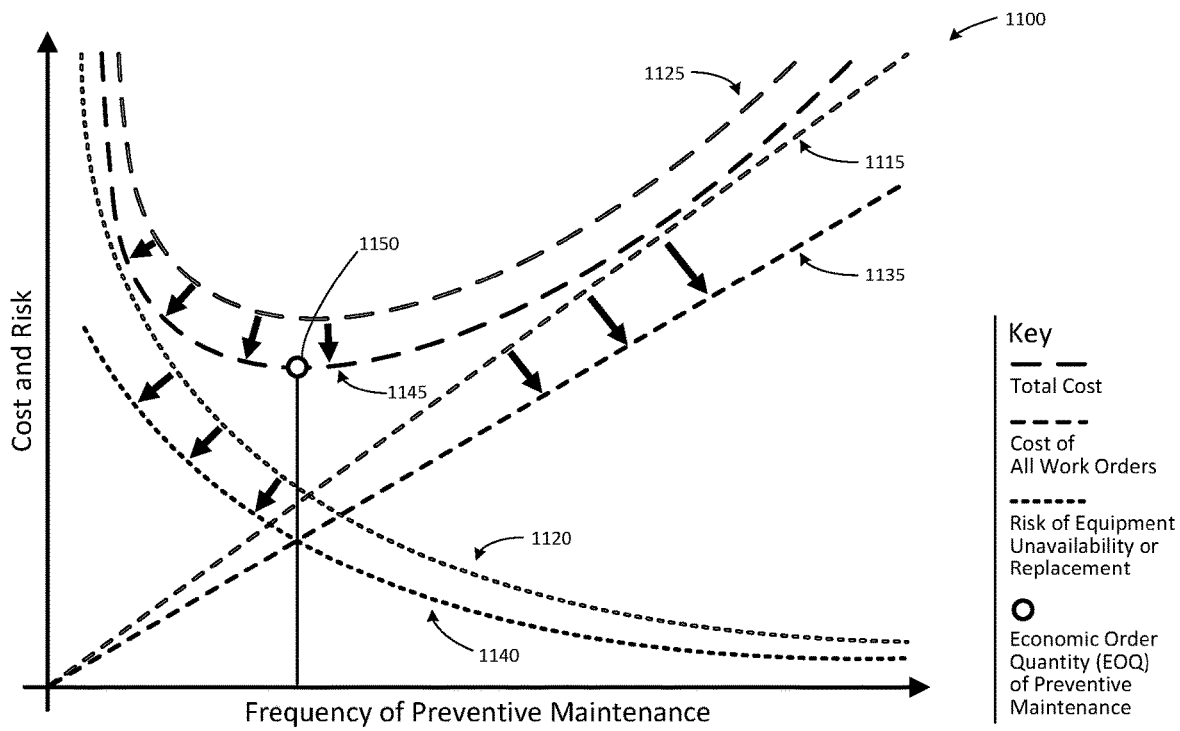
FIG. 11B shows the graph plotting functions of cost or risk against the frequency of preventive maintenance adjusted to show the effects of implementing the invention on cost and risk.

Referring now to FIG. 11B, the graph is updated to show the effects of implementing an embodiment of the system and method for long-term predictions. Using an embodiment of the system and method for long-term predictions reduces the cost of a maintenance work order at least because data science techniques applied to data gathered from IOT sensors allow device maintenance to be selectively reduced or omitted if scheduled preventive maintenance tasks are not predicted to be necessary. Thus, the example function of cost of all maintenance work orders against the frequency of preventive maintenance 1115 is modified into function 1135 plotted on the graph 1100.

Further, using an embodiment of the system and method for long-term predictions reduces the likelihood of device unavailability or replacement at least because data science techniques applied to data gathered from IOT sensors allow timely prediction of critical failures. Thus, the example function of the risk of device (equipment) unavailability or replacement against the frequency of preventive maintenance 1120 is modified into function 1140 plotted on the graph 1100. The overall effect of using an embodiment of the system and method for long-term predictions is to shift the example function of the total cost of device maintenance against the frequency of preventive maintenance 1125 downward to function 1145 plotted on the graph 1100.

In short, total costs of device maintenance are reduced by using an embodiment of the system and method for long-term predictions. The EOQ point of preventive maintenance 1130 is therefore reduced on the cost dimension to new EOQ point 1150. Moreover, the EOQ point is also reduced on the risk dimension so that devices can be used for longer periods.

The system 100 also enables robotic preventive maintenance of devices. A robot may be configured to perform one or more maintenance tasks on a device. The long-term prediction of specific maintenance tasks described herein enables the robot to be in place and perform the maintenance task as needed, and not based only on a set schedule. Further, devices may be offered as a subscription service. Robotic maintenance of devices offered as a service will aid in keeping costs low, especially if implemented in accordance with the long-term prediction for specific maintenance described herein.

Additionally, the long-term specific maintenance systems and methods described herein are truly predictive because they predict over long periods, and do not wait for noise or heat build-up to detect an impending failure.

The arrangements of elements described herein for long-term specific maintenance predictions are an unconventional and improved solution to the problem of timely anticipating device failure, and accordingly reducing machine downtime.

It is at least the practical application of the failure probability curve analyses described herein that brings about the improvement in preventing device failure and unscheduled maintenance.

Special Purpose Computing Device Embodiment

Figure 12:
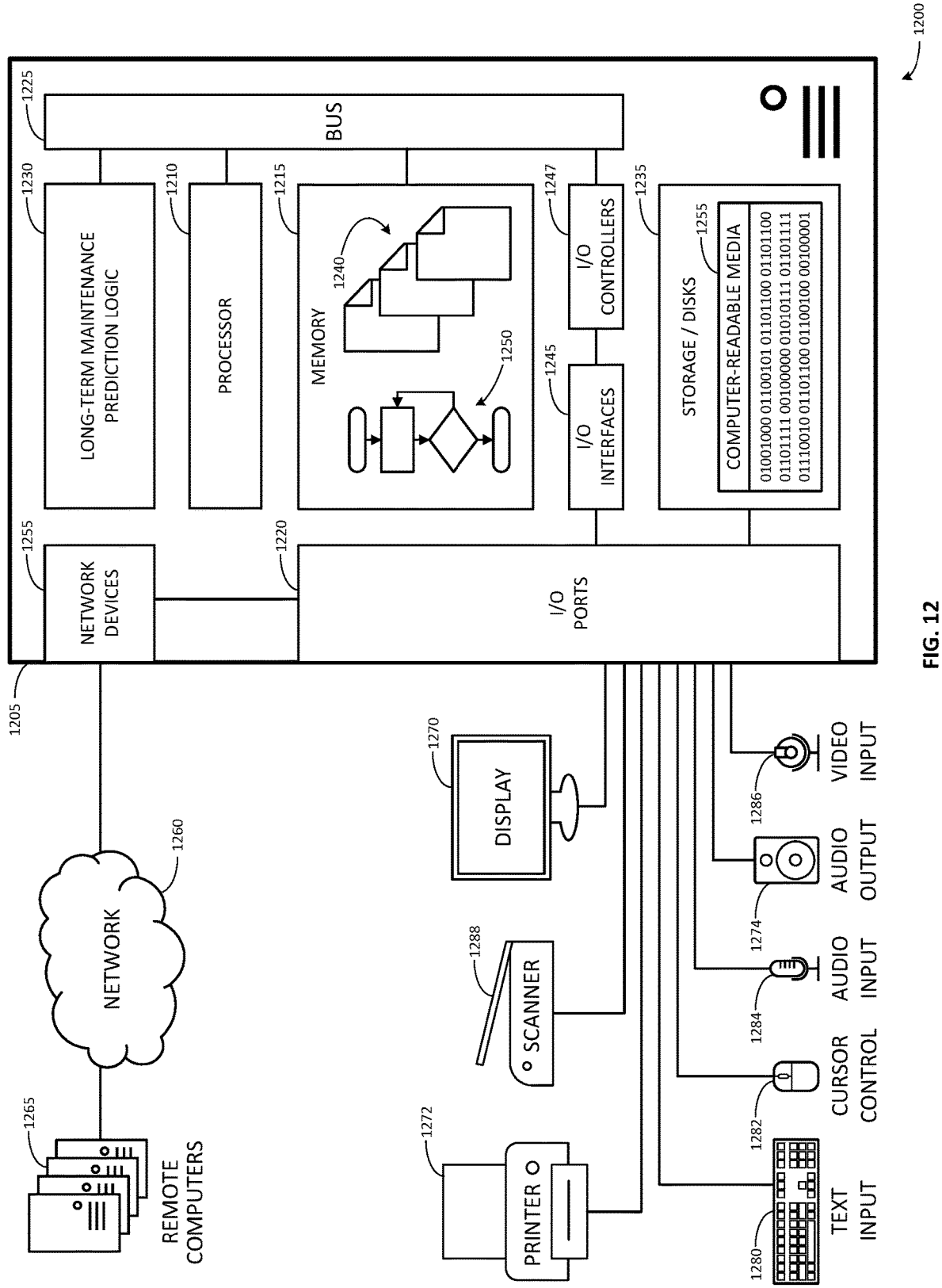
FIG. 12 illustrates an embodiment of a computing system configured with the example systems and/or methods disclosed.

FIG. 12 illustrates an example computing device that is configured and/or programmed with one or more of the example systems and methods described herein, and/or equivalents. The example computing device may be a computer 1205 that includes a processor 1210, a memory 1215, and input/output ports 1220 operably connected by a bus 1225. In one example, the computer 1205 may include long-term maintenance prediction logic 1230 configured to enable automated long-term prediction of specific maintenance such as the logic and systems shown and described with respect to FIGS. 1-11. In different examples, the logic 1230 may be implemented in hardware, a non-transitory computer-readable medium with stored instructions, firmware, and/or combinations thereof. While the logic 1230 is illustrated as a hardware component attached to the bus 1225, it is to be appreciated that in other embodiments, the logic 1230 could be implemented in the processor 1210, stored in memory 1215, or stored in disk 1235.

In one embodiment, logic 1230 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to automate process discovery and facilitation. The means may also be implemented as stored computer executable instructions that are presented to computer 1205 as data 1240 that are temporarily stored in memory 1215 and then executed by processor 1210.

Logic 1230 may also provide means (e.g., hardware, non-transitory computer-readable medium that stores executable instructions, firmware) for performing automated process discovery and facilitation.

Generally describing an example configuration of the computer 1205, the processor 1210 may be a variety of various processors including dual microprocessor and other multi-processor architectures. A memory 1215 may include volatile memory and/or non-volatile memory. Non-volatile memory may include, for example, ROM, PROM, EPROM, EEPROM, and so on. Volatile memory may include, for example, RAM, SRAM, DRAM, and so on.

A storage disk 1235 may be operably connected to the computer 1205 by way of, for example, an input/output (I/O) interface (e.g., card, device) 1245 and an input/output port 1220 that are controlled by at least an input/output (I/O) controller 1247. The disk 1235 may be, for example, a magnetic disk drive, a solid-state disk drive, a floppy disk drive, a tape drive, a Zip drive, a flash memory card, a memory stick, and so on. Furthermore, the disk 1235 may be a CD-ROM drive, a CD-R drive, a CD-RW drive, a DVD ROM, Blu-Ray, or other optical disk. The memory 1215 can store a process 1250 and/or a data 1240, for example. The disk 1235 and/or the memory 1215 can store an operating system that controls and allocates resources of the computer 1205.

The computer 1205 may interact with input/output (I/O) devices by way of the input/output (I/O) controller 1247, the input/output (I/O) interfaces 1245, and the input/output ports 1220. Input/output devices may be, for example, a keyboard, a microphone, a pointing and selection device, cameras, video cards, displays, the disk 1235, the network devices 1255, and so on. The input/output ports 1220 may include, for example, serial ports, parallel ports, and USB ports.

The computer 1205 can operate in a network environment and thus may be connected to the network devices 1255 by way of the I/O interfaces 1245, and/or the I/O ports 1220. Through the network devices 1255, the computer 1205 may interact with a network 1260. Through the network 1260, the computer 1205 may be logically connected to remote computers 1265. Networks with which the computer 1205 may interact include, but are not limited to, a LAN, a WAN, and other networks.

The computer 1205 can control one or more output devices, or be controlled by one or more input devices, through I/O ports 1220. The output devices include one or more displays 1270, printers 1275 (such as inkjet, laser, or 3D printers), and audio output devices 1280 (such as speakers or headphones). The input devices include one or more text input devices 1285 (such as keyboards), cursor controllers 1287 (such as mice, touchpads, or touch screens), audio input devices 1289 (such as microphones), and video output devices 1291 (such as video and still cameras).

—Data Operations—

Data can be stored in memory by a write operation, which stores a data value in memory at a memory address. The write operation is generally: (1) use the processor to put a destination address into a memory address register; (2) use the processor to put a data value to be stored at the destination address into a memory data register; and (3) use the processor to copy the data from the memory data register to the memory cell indicated by the memory address register. Stored data can be retrieved from memory by a read operation, which retrieves the data value stored at the memory address. The read operation is generally: (1) use the processor to put a source address into the memory address register; and (2) use the processor to copy the data value currently stored at the source address into the memory data register. In practice, these operations are functions offered by separate software modules, for example as functions of an operating system. The specific operation of processor and memory for the read and write operations, and the appropriate commands for such operation will be understood and may be implemented by the skilled artisan.

Generally, in some embodiments, references to storage or storing indicate storage as a data structure in memory or storage/disks of a computing device (such as memory 1215, or storage/disks 1235 of computing device 1205 or remote computers 1265).

Further, in some embodiments, a database associated with the method may be included in memory. In a database, the storage and retrieval functions indicated may include the self-explanatory 'create,' 'read,' 'update,' or 'delete' data (CRUD) operations used in operating a database. These operations may be initiated by a query composed in the appropriate query language for the database. The specific form of these queries may differ based on the particular form of the database, and based on the query language for the database. For each interaction with a database described herein, the processor composes a query of the indicated database to perform the unique action described. If the query includes a 'read' operation, the data returned by executing the query on the database may be stored as a data structure in a data store, such as data store 270, or in memory. The formation and operation of databases will be understood and may be implemented by the skilled artisan.

Software Module Embodiments

In general, software instructions are designed to be executed by a suitably programmed processor. These software instructions may include, for example, computer-executable code and source code that may be compiled into computer-executable code. These software instructions may also include instructions written in an interpreted programming language, such as a scripting language.

In a complex system, such instructions are typically arranged into program modules with each such module performing a specific task, process, function, or operation. The entire set of modules may be controlled or coordinated in their operation by an operating system (OS) or other form of organizational platform.

In one embodiment, one or more of the components, functions, methods, or processes described herein are configured as modules stored in a non-transitory computer readable medium. The modules are configured with stored software instructions that when executed by at least a processor accessing memory or storage cause the computing device to perform the corresponding function(s) as described herein.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

API: Application Programming Interface.
REST API: REpresentational State Transfer API.
ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
HTTPS: HTTP Secure
LAN: local area network.
JSON: JavaScript Object Notation.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
SQL: structured query language.
USB: universal serial bus.
XML: extensible markup language.
WAN: wide area network.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by at least a processor of a computer cause the computer to:
   update a failure probability curve for a component part of a device based at least in part on data obtained from a sensor;
   determine based at least in part on the updated failure probability curve that a likelihood of failure for the component part following a first upcoming planned maintenance and before a second upcoming planned maintenance exceeds a threshold; and
   transmit a work order for specific maintenance to reduce the likelihood of failure of the component part to be performed during the first upcoming planned maintenance.

2. The non-transitory computer-readable medium of claim 1, wherein the instructions that cause the update to the failure probability curve further cause the computer to:
   retrieve a current amount of usage for the component part;
   determine a trend from the current amount of usage and the data obtained from the sensor; and
   adjust a weight variable of the failure probability curve to adjust the failure probability curve toward the trend.

3. The non-transitory computer-readable medium of claim 1, wherein the instructions further cause the computer to identify as the first upcoming planned maintenance a latest planned maintenance in a planned maintenance schedule for which the likelihood of failure of the component part remains below the threshold.

4. The non-transitory computer-readable medium of claim 1, wherein the instructions further cause the computer to, in response to the transmission of the work order:
   generate and issue purchase orders for parts for the specific maintenance; and
   include the first upcoming planned maintenance on a calendar of personnel involved with the specific maintenance.

5. The non-transitory computer-readable medium of claim 1, wherein the instructions further cause the computer to retrieve the failure probability curve for the component part from a database, wherein the failure probability curve is specific to a type of the component part.

6. The non-transitory computer-readable medium of claim 1, wherein the instructions further cause the computer to generate the failure probability curve for the component part based at least in part on aggregate failure data for parts of a similar or same type as the component part.

7. The non-transitory computer-readable medium of claim 1, wherein the update to the failure probability curve is further based at least in part on values of one or more causal factors sensed by additional sensors.

8. A computer-implemented method, the method comprising:
   updating a failure probability curve for a component part of a device based at least in part on data obtained from a sensor;
   determining based at least in part on the updated failure probability curve that a likelihood of failure for the component part following a first upcoming planned maintenance and before a second upcoming planned maintenance exceeds a threshold; and transmitting a work order for specific maintenance to reduce the likelihood of failure of the component part to be performed during the first upcoming planned maintenance.

9. The computer-implemented method of claim 8, further comprising:
retrieving a current amount of usage for the component part;
determining a trend from the current amount of usage and the data obtained from the sensor; and
adjusting a weight variable of the failure probability curve to adjust the failure probability curve toward the trend.

10. The computer-implemented method of claim 8, further comprising identifying as the first upcoming planned maintenance a latest planned maintenance in a planned maintenance schedule for which the likelihood of failure of the component part remains below the threshold.

11. The computer-implemented method of claim 8, further comprising, in response to the transmission of the work order:
generating and issuing purchase orders for parts for the specific maintenance; and
including the first upcoming planned maintenance on a calendar of personnel involved with the specific maintenance.

12. The computer-implemented method of claim 8, further comprising retrieving the failure probability curve for the component part from a database, wherein the failure probability curve is specific to a type of the component part.

13. The computer-implemented method of claim 8, further comprising generating the failure probability curve for the component part based at least in part on aggregate failure data for parts of a similar or same type as the component part.

14. The computer-implemented method of claim 8, wherein the update to the failure probability curve is further based at least in part on values of one or more causal factors sensed by additional sensors.

15. A computing system, comprising:
at least one processor connected to at least one memory;
a sensor associated with a component part of a device that provides sensed information to the processor;
a non-transitory computer-readable medium including instructions that when executed by at least the processor and memory cause the computing system to:
update a failure probability curve for the component part of the device based at least in part on data obtained from the sensor associated with the component part;
determine based at least in part on the updated failure probability curve that a likelihood of failure for the component part following a first upcoming planned maintenance and before a second upcoming planned maintenance exceeds a threshold; and
transmit a work order for specific maintenance to reduce the likelihood of failure of the component part to be performed during the first upcoming planned maintenance.

16. The computing system of claim 15, wherein the instructions that cause the update to the failure probability curve further cause the computing system to:
retrieve a current amount of usage for the component part;
determine a trend from the current amount of usage and the data obtained from the sensor; and
adjust a weight variable of the failure probability curve to adjust the failure probability curve toward the trend.

17. The computing system of claim 15, wherein the instructions further cause the computing system to identify as the first upcoming planned maintenance a latest planned maintenance in a planned maintenance schedule for which the likelihood of failure of the component part remains below the threshold.

18. The computing system of claim 15, wherein the instructions further cause the computing system to, in response to the transmission of the work order:
generate and issue purchase orders for parts for the specific maintenance; and
include the first upcoming planned maintenance on a calendar of personnel involved with the specific maintenance.

19. The computing system of claim 15, wherein the instructions further cause the computing system to retrieve the failure probability curve for the component part from a database, wherein the failure probability curve is specific to a type of the component part.

20. The computing system of claim 15, wherein the instructions further cause the computing system to generate the failure probability curve for the component part based at least in part on aggregate failure data for parts of a similar or same type as the component part.

* * * * *

UNITED STATES PATENT AND TRADEMARK OFFICE
CERTIFICATE OF CORRECTION

PATENT NO. : 11,703,851 B2
APPLICATION NO. : 17/532554
DATED : July 18, 2023
INVENTOR(S) : Akula It is certified that error appears in the above-identified patent and that said Letters Patent is hereby corrected as shown below:

On the Title Page

Column 1, under Assignee, Line 2, delete "CORPORATION" and insert -- CORPORATION, Redwood Shores, (US) --, therefor.

In the Specification

In Column 23, Line 64, delete "failure" and insert -- failure. --, therefor.

Signed and Sealed this
Twenty-second Day of October, 2024

Katherine Kelly Vidal
*Director of the United States Patent and Trademark Office*